US012562179B2

(12) United States Patent

Fukui

(10) Patent No.: US 12,562,179 B2

(45) Date of Patent: Feb. 24, 2026

(54) INFORMATION PROCESSING DEVICE, INFORMATION PROCESSING METHOD, INFORMATION PROCESSING SYSTEM, AND PROGRAM

(71) Applicant: Sony Group Corporation, Tokyo (JP)

(72) Inventor: Takao Fukui, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 202 days.

(21) Appl. No.: 18/557,065

(22) PCT Filed: Mar. 22, 2022

(86) PCT No.: PCT/JP2022/012940

§ 371 (c)(1),
(2) Date: Oct. 25, 2023

(87) PCT Pub. No.: WO2022/230450

PCT Pub. Date: Nov. 3, 2022

(65) Prior Publication Data

US 2024/0221770 A1     Jul. 4, 2024

(30) Foreign Application Priority Data

Apr. 30, 2021     (JP) ................................. 2021-077370

(51) Int. Cl.
G06F 17/00     (2019.01)
G06F 3/16     (2006.01)
(Continued)

(52) U.S. Cl.
CPC .......... G10L 21/0232 (2013.01); G06F 3/165 (2013.01); G10K 15/12 (2013.01);
(Continued)

(58) Field of Classification Search
CPC ...... G06F 3/165; G10K 15/12; G10K 15/063; G10L 21/0208; G10L 21/0232; G10L 25/30; G10L 2021/02082
(Continued)

(56) References Cited

U.S. PATENT DOCUMENTS 12,014,748 B1 *  6/2024  Giri ........................ G10L 21/034
2020/0286504 A1 *  9/2020  Seetharaman ...... G10L 21/0232

FOREIGN PATENT DOCUMENTS

JP     2009-276365 A     11/2009
JP     2014-077916 A     5/2014
(Continued)

OTHER PUBLICATIONS

Koo: Reverb Conversion of Mixed Vocal Tracks Using an End-to-end Convolutional Deep Neural Network (Year: 2021).*

(Continued)

*Primary Examiner* — Paul C Mccord

(74) *Attorney, Agent, or Firm* — XSENSUS LLP

(57)     ABSTRACT

For example, reverberation processing in consideration of sound quality can be performed.

Provided is an information processing device including a training processing unit that generates training data by convolving a measurement signal representing acoustic characteristics collected by a same sound collection unit as a sound collection unit used for collecting an observation signal with a reference signal having sound quality and reverberation characteristics different from the observation signal, generates teaching data by adapting, to the reference signal, an average level and a delay value of a convolution signal generated by convolving a direct sound component of the measurement signal with the reference signal, and trains a learning model for performing reverberation processing of (Continued)

the observation signal collected by the sound collection unit by using the training data and the teaching data as input data.

18 Claims, 16 Drawing Sheets

(51) Int. Cl.

| | |
|---|---|
| *G10K 15/12* | (2006.01) |
| *G10L 15/06* | (2013.01) |
| *G10L 21/0232* | (2013.01) |
| *G10L 21/0208* | (2013.01) |
| *G10L 25/30* | (2013.01) |

(52) U.S. Cl.
CPC .. *G10L 15/063* (2013.01); *G10L 2021/02082* (2013.01); *G10L 25/30* (2013.01)

(58) Field of Classification Search
USPC ........................................................ 704/226
See application file for complete search history.

(56) References Cited

FOREIGN PATENT DOCUMENTS

| | | |
|---|---|---|
| JP | 2018-146683 A | 9/2018 |
| WO | 2019/026973 A1 | 2/2019 |

OTHER PUBLICATIONS

International Search Report and Written Opinion mailed on Jun. 14, 2022, received for PCT Application PCT/JP2022/012940, filed on Mar. 22, 2022, 8 pages including English Translation.

* cited by examiner

FIG. 7
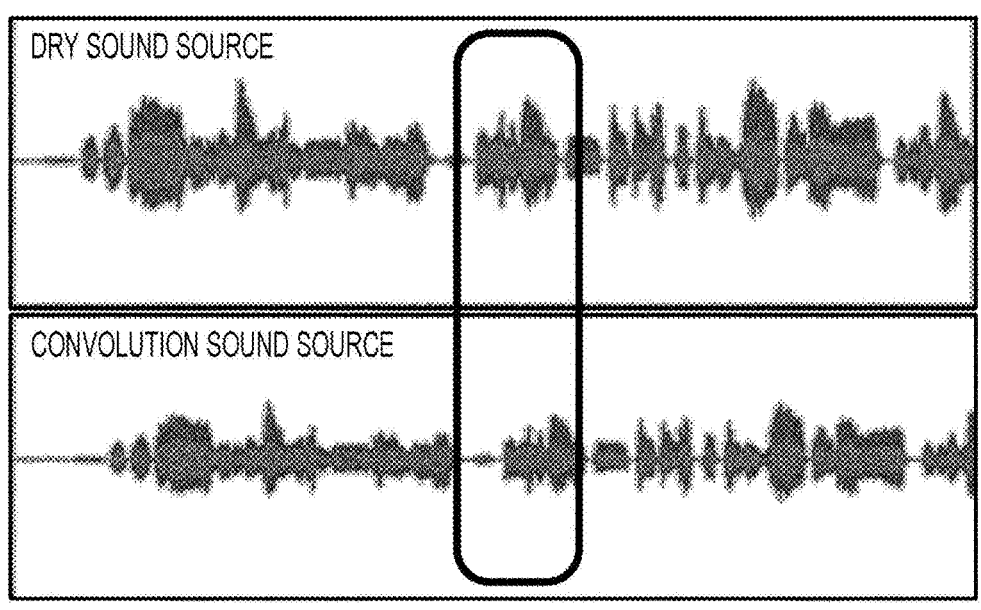
ENLARGE
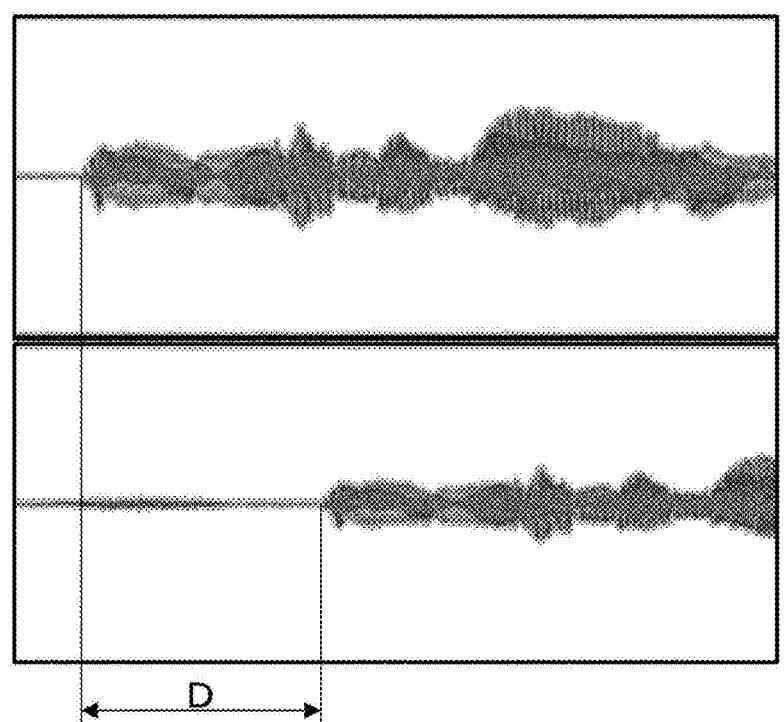

FIG. 8
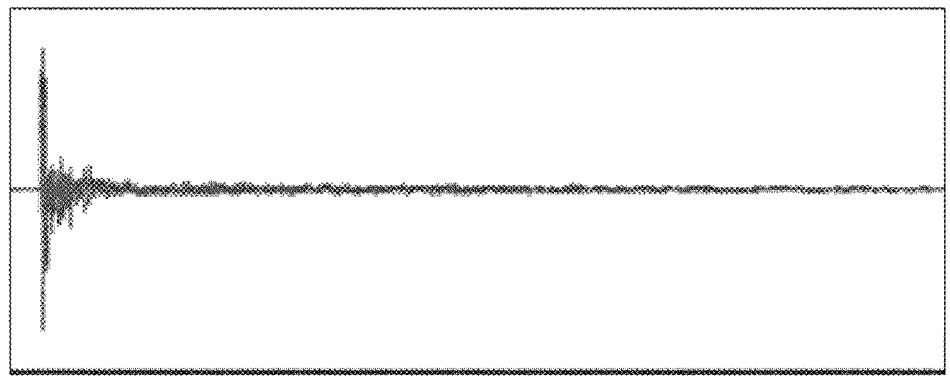
IR FOR CONVOLUTION
ENLARGE HEAD PORTION
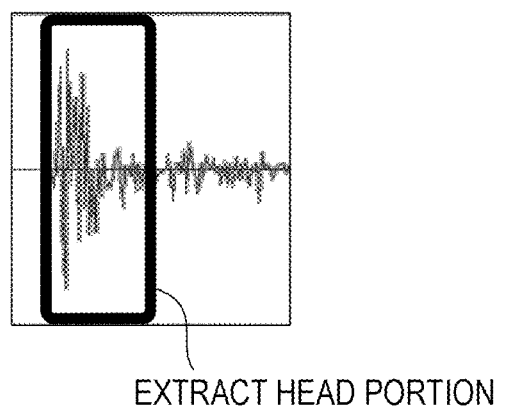
EXTRACT HEAD PORTION

FIG. 9
SOUND WITHOUT REVERB HAVING HIGH SOUND QUALITY
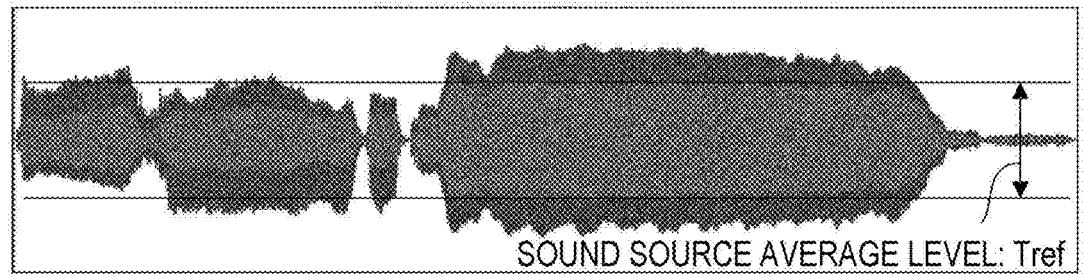
SOUND SOURCE AVERAGE LEVEL: Tref
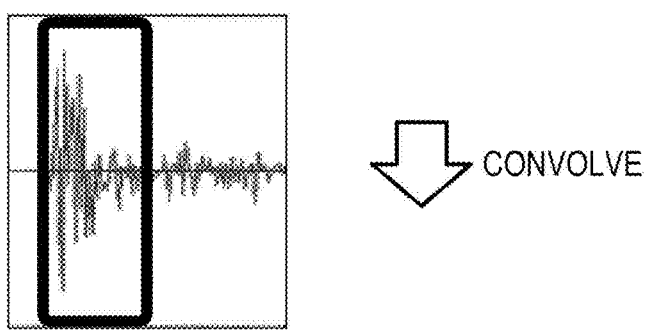
⇩ CONVOLVE
TEACHING SOUND SOURCE FOR TRAINING
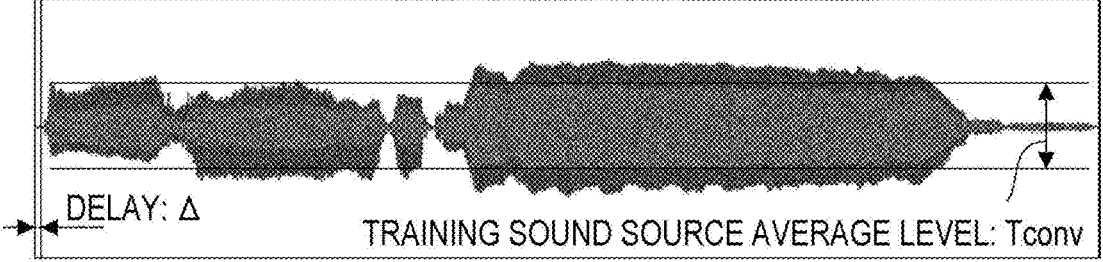
DELAY: Δ
TRAINING SOUND SOURCE AVERAGE LEVEL: Tconv

FIG. 10

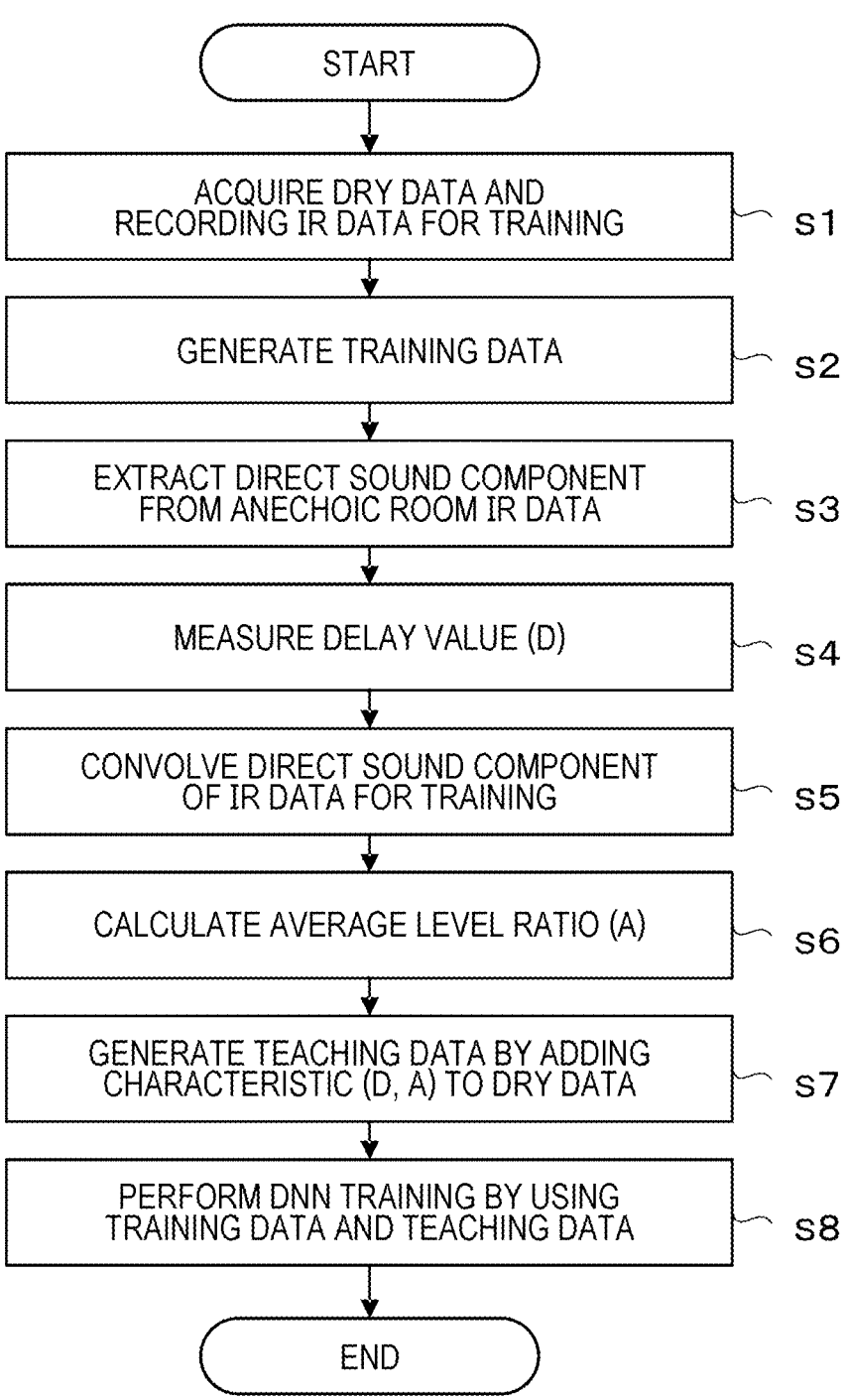

START

ACQUIRE DRY DATA AND
RECORDING IR DATA FOR TRAINING ⌐ s1

GENERATE TRAINING DATA ⌐ s2

EXTRACT DIRECT SOUND COMPONENT
FROM ANECHOIC ROOM IR DATA ⌐ s3

MEASURE DELAY VALUE (D) ⌐ s4

CONVOLVE DIRECT SOUND COMPONENT
OF IR DATA FOR TRAINING ⌐ s5

CALCULATE AVERAGE LEVEL RATIO (A) ⌐ s6

GENERATE TEACHING DATA BY ADDING
CHARACTERISTIC (D, A) TO DRY DATA ⌐ s7

PERFORM DNN TRAINING BY USING
TRAINING DATA AND TEACHING DATA ⌐ s8

END

DEREVERBERATION SIGNAL

REVERBERATION COMPONENT

INFORMATION PROCESSING DEVICE, INFORMATION PROCESSING METHOD, INFORMATION PROCESSING SYSTEM, AND PROGRAM

CROSS-REFERENCE TO RELATED APPLICATIONS

The present application is based on PCT filing PCT/JP2022/012940, filed Mar. 22, 2022, which claims priority from Japanese Patent Application No. 2021-077370, filed Apr. 30, 2021, the entire contents of each are incorporated herein by reference.

TECHNICAL FIELD

The present disclosure relates to an information processing device, an information processing method, and an information processing system, and a program.

BACKGROUND ART

A technology for removing reverberation from sound has been known. For example, Patent Documents 1 and 2 below disclose a dereverberation technology using machine learning.

CITATION LIST

Patent Document

Patent Document 1: Japanese Patent Application Laid-Open No. 2018-146683
Patent Document 2: International Publication Pamphlet No. WO2019-026973

SUMMARY OF THE INVENTION

Problems to be Solved by the Invention

However, the technologies disclosed in Patent Documents 1 and 2 described above merely remove reverberation from sound of a conference or the like to set sound to be easily listened to and do not consider sound quality.

An object of the present disclosure is to propose an information processing device, an information processing method, an information processing system, and a program capable of performing reverberation processing in consideration of sound quality.

Solutions to Problems

The present disclosure is, for example,
an information processing device including a training processing unit that generates training data by convolving a measurement signal representing acoustic characteristics collected by a same sound collection unit as a sound collection unit used for collecting an observation signal with a reference signal having sound quality and reverberation characteristics different from the observation signal, generates teaching data by adapting, to the reference signal, an average level and a delay value of a convolution signal generated by convolving a direct sound component of the measurement signal with the reference signal, and trains a learning model for performing reverberation processing of the observation signal collected by the sound collection unit by using the training data and the teaching data as input data.

The present disclosure is, for example,
an information processing method including performing training processing of generating training data by convolving a measurement signal representing acoustic characteristics collected by a same sound collection unit as a sound collection unit used for collecting an observation signal with a reference signal having sound quality and reverberation characteristics different from the observation signal, generating teaching data by adapting, to the reference signal, an average level and a delay value of a convolution signal generated by convolving a direct sound component of the measurement signal with the reference signal, and training a learning model for performing reverberation processing of the observation signal collected by the sound collection unit by using the training data and the teaching data as input data.

The present disclosure is, for example,
a program for causing a computer to execute training processing of generating training data by convolving a measurement signal representing acoustic characteristics collected by a same sound collection unit as a sound collection unit used for collecting an observation signal with a reference signal having sound quality and reverberation characteristics different from the observation signal, generating teaching data by adapting, to the reference signal, an average level and a delay value of a convolution signal generated by convolving a direct sound component of the measurement signal with the reference signal, and training a learning model for performing reverberation processing of the observation signal collected by the sound collection unit by using the training data and the teaching data as input data.

The present disclosure is, for example,
an information processing device including
a dereverberation unit that inputs second acoustic data collected by a microphone and outputs third acoustic data obtained by removing a reverberation component from the second acoustic data by using a learning model obtained by performing machine learning by using first data generated by convolving first acoustic data collected by the microphone with dry data containing no reverberation and second data generated by adapting, to the dry data, an average level and a delay value of a convolution signal generated by convolving a direct sound component of the first acoustic data with the dry data,
a reverberation component feature extraction unit that extracts feature data representing a reverberation component of the second acoustic data by using the second acoustic data and the third acoustic data, and
a reverberation addition unit that inputs sound source data, adds reverberation having characteristics based on the feature data, and outputs the sound source data.

The present disclosure is, for example,
an information processing method including causing a computer to execute processing of
inputting second acoustic data collected by a microphone and outputting third acoustic data obtained by removing a reverberation component from the second acoustic data by using a learning model obtained by performing machine learning by using first data generated by convolving first acoustic data collected by the microphone with dry data containing no reverberation and second data generated by adapting, to the dry data, an average level and a delay value of a convolution signal generated by convolving a direct sound component of the first acoustic data with the dry data, extracting feature data representing a reverberation component of the second acoustic data by using the second acoustic data and the third acoustic data, and inputting sound source data, adding reverberation having characteristics based on the feature data, and outputting the sound source data.

The present disclosure is, for example, a program for causing a computer to execute processing of inputting second acoustic data collected by a microphone and outputting third acoustic data obtained by removing a reverberation component from the second acoustic data by using a learning model obtained by performing machine learning by using first data generated by convolving first acoustic data collected by the microphone with dry data containing no reverberation and second data generated by adapting, to the dry data, an average level and a delay value of a convolution signal generated by convolving a direct sound component of the first acoustic data with the dry data, extracting feature data representing a reverberation component of the second acoustic data by using the second acoustic data and the third acoustic data, and inputting sound source data, adding reverberation having characteristics based on the feature data, and outputting the sound source data.

The present disclosure is, for example, an information processing system including a microphone, a learning model that is obtained by performing machine learning by using first data generated by convolving first acoustic data collected by the microphone with dry data containing no reverberation and second data generated by adapting, to the dry data, an average level and a delay value of a convolution signal generated by convolving a direct sound component of the first acoustic data with the dry data, a sound source output unit that outputs sound source data, a memory that stores second acoustic data collected by the microphone and the sound source data, a dereverberation unit that inputs the second acoustic data and outputs third acoustic data obtained by removing a reverberation component from the second acoustic data by using the learning model, a reverberation component feature extraction unit that extracts feature data representing a reverberation component of the second acoustic data by using the second acoustic data and the third acoustic data, and a reverberation addition unit that inputs the sound source data, adds reverberation having characteristics based on the feature data, and outputs the sound source data.

BRIEF DESCRIPTION OF DRAWINGS

FIG. 3 is a diagram illustrating a configuration example of a teaching data generation unit.

FIG. 7 is a diagram for describing measurement of a delay value.

FIG. 8 is a diagram for describing an extraction example of a direct sound component of an impulse response signal collected for learning.

FIG. 9 is a diagram for describing characteristic addition.

FIG. 10 is a flowchart illustrating a flow of training processing by the information processing device.

FIG. 13 is a diagram illustrating a configuration example of an information processing device at the time of editing according to the modification example.

MODE FOR CARRYING OUT THE INVENTION

Figure 1:
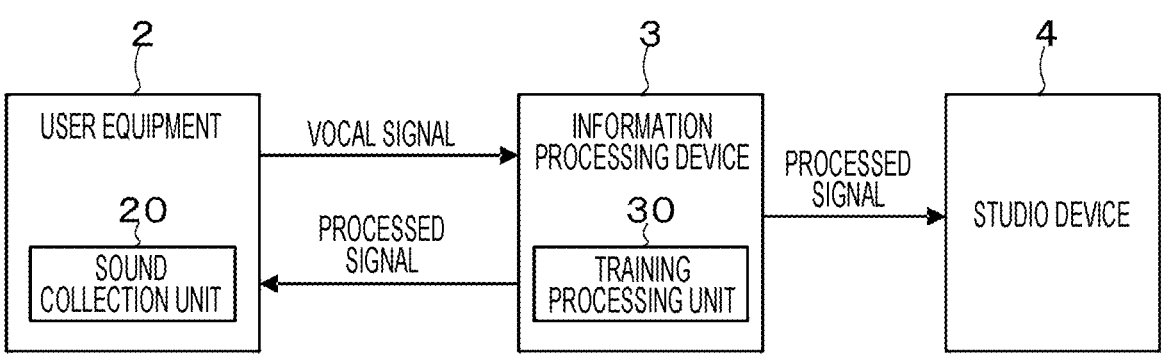
FIG. 1 is a diagram illustrating a configuration example of an information processing system according to an embodiment.

Hereinafter, an embodiment and the like of the present disclosure will be described with reference to the drawings. Note that, an embodiment and the like to be described below is a preferred specific example of the present disclosure, and the content of the present disclosure is not limited to this embodiment and the like. The description will be given in the following order.

<1. Background>
<2. Embodiment>
<3. Modification Example>

1. BACKGROUND

First, the background of the present disclosure will be described. Content production is required to be changed. In the related art, a content (for example, commercial content) that requires recording of sound such as music has been produced in a place (for example, studio) where a sufficient recording environment is established. Incidentally, in recent years, a remote work by infection control measures and the like, Internet distribution by independent production, and the like have increased. Therefore, it is desired to establish an environment in which content production focusing on sound quality can be easily performed even in a place where a sufficient recording environment is not established (for example, home).

For example, in music genres such as pop music, recording can be often performed at home of an individual musician or the like in the case of orchestras in many cases, but recording is generally performed in a studio in the case of vocals. However, in the future, there is a demand for simple recording at home or the like in the case of vocals.

A problem here is removal of reverberation when recording is performed in a place where a sufficient recording environment is not established, such as home. For example, in music production, music is completed by performing recording with sound without reverberation first and adding reverberation later in many cases. However, as described above, in the related art, there is only a dereverberation technology to the extent that sound is easily listened to, and there is no dereverberation function at a clear product quality level. Therefore, a studio engineer has had to take time to remove reverberation on the basis of viewing. Furthermore, even though reverberation can be removed, in recording using a microphone not for professional use such as a microphone of a smartphone, it is assumed that sound quality may become a problem as compared with recording using professional equipment in a studio.

Accordingly, currently, it is necessary for an engineer to bring a sound source recorded at home or the like to a studio or the like and perform recording while viewing the sound quality check, the removal of reverberation, and the like by using professional equipment for music production, and a huge processing time is required. Furthermore, in some cases, it is considered that there may be a case where the quality of commercial content is not achieved and recording needs to be performed again in a studio. For such a reason, a reverberation processing technology considering sound quality is desired.

2. Embodiment

2-1. Configuration Example of System

FIG. 1 is a diagram illustrating a configuration example of an information processing system (information processing system 1) according to an embodiment. The information processing system 1 is a system for music production. The information processing system 1 includes user equipment 2, an information processing device 3, and a studio device 4.

The user equipment 2 is a device used by a user. The user equipment 2 includes, for example, a terminal device such as a smartphone, a tablet, or a personal computer. The user equipment 2 has a communication function capable of communicating with the information processing device 3. The user equipment 2 includes a sound collection unit 20 such as a microphone, and has a sound collection function capable of collecting an external sound. For example, in a case where the user equipment 2 is a smartphone, a microphone of the smartphone can be used as the sound collection unit 20.

Specifically, the user equipment 2 transmits, to the information processing device 3, an observation signal collected by the sound collection unit 20 (in this example, a vocal signal obtained by collecting a vocal sound by a vocalist) at a place where a sufficient recording environment is not established (for example, user's home). The user equipment 2 includes the sound collection unit 20, and thus, it is possible to transmit the vocal signal to the information processing device 3 without time and effort. Note that, the sound collection unit 20 may be used while being separately connected to the user equipment 2, or may be included in a device other than the user equipment 2. In short, it is sufficient if the vocal signal transmitted to the information processing device 3 is collected by the sound collection unit 20, and whether or not the user equipment 2 and the sound collection unit 20 are connected does not matter.

The information processing device 3 is a device that performs reverberation processing of an input signal, and is provided as, for example, a cloud server on a network such as the Internet. Specifically, the information processing device 3 has a function of removing reverberation and characteristics of a recording system by using machine learning. The characteristics of the recording system mentioned here are characteristics unintentionally added by recording, and are, for example, noise characteristics and characteristics that are not necessary due to equipment such as a microphone and a speaker used for recording. The information processing device 3 includes a training processing unit 30 (details will be described later) that trains a learning model for removing the reverberation and the characteristics of the recording system.

Furthermore, the information processing device 3 has a communication function capable of communicating with each of the user equipment 2 and the studio device 4. Specifically, the information processing device 3 receives the vocal signal transmitted from the user equipment 2, generates a processed signal by removing the reverberation and the characteristics of the recording system from the received vocal signal, and transmits the generated processed signal to the studio device 4. Note that, this series of processing may be real-time processing.

The studio device 4 is a device having a commercial content production function such as mixing and mastering. The studio device 4 includes, for example, a personal computer, and is provided in a place where a sufficient recording environment is established, such as a studio. The studio device 4 has a communication function capable of communicating with the information processing device 3. The studio device 4 receives the processed signal transmitted from the information processing device 3 and performs processing such as mixing and mastering.

Note that, as illustrated in the drawing, the processed signal processed by the information processing device 3 may be transmitted from the information processing device 3 to the user equipment 2. Therefore, for example, it is possible to cope with a case where music production is performed by personal use (a case where studio production is unnecessary) or the like. The processed signal may be transmitted to both the user equipment 2 and the studio device 4. Furthermore, a plurality of pieces of user equipment 2 may be provided, and the transmission of the vocal signal and the reception of the processed signal may be performed by different pieces of user equipment 2. For example, a mode in which the vocal signal is transmitted from the smartphone and the processed signal is received by the personal computer at home may be adopted.

Note that, as described above, the information processing device 3 may not be provided on the network, and may have the functions of the user equipment 2 and the studio device 4, and may be able to be used (function) as at least one of the user equipment 2 or the studio device 4. As described above, the information processing device 3 may be provided on an operation side operated by the user or a studio side. Note that, connection between the respective devices including the sound collection unit 20 described above (for example, a connection mode such as wired or wireless, a communication method, and the like) is not limited to a specific connection.

2-2. Configuration Example of Information Processing Device

Figure 2:
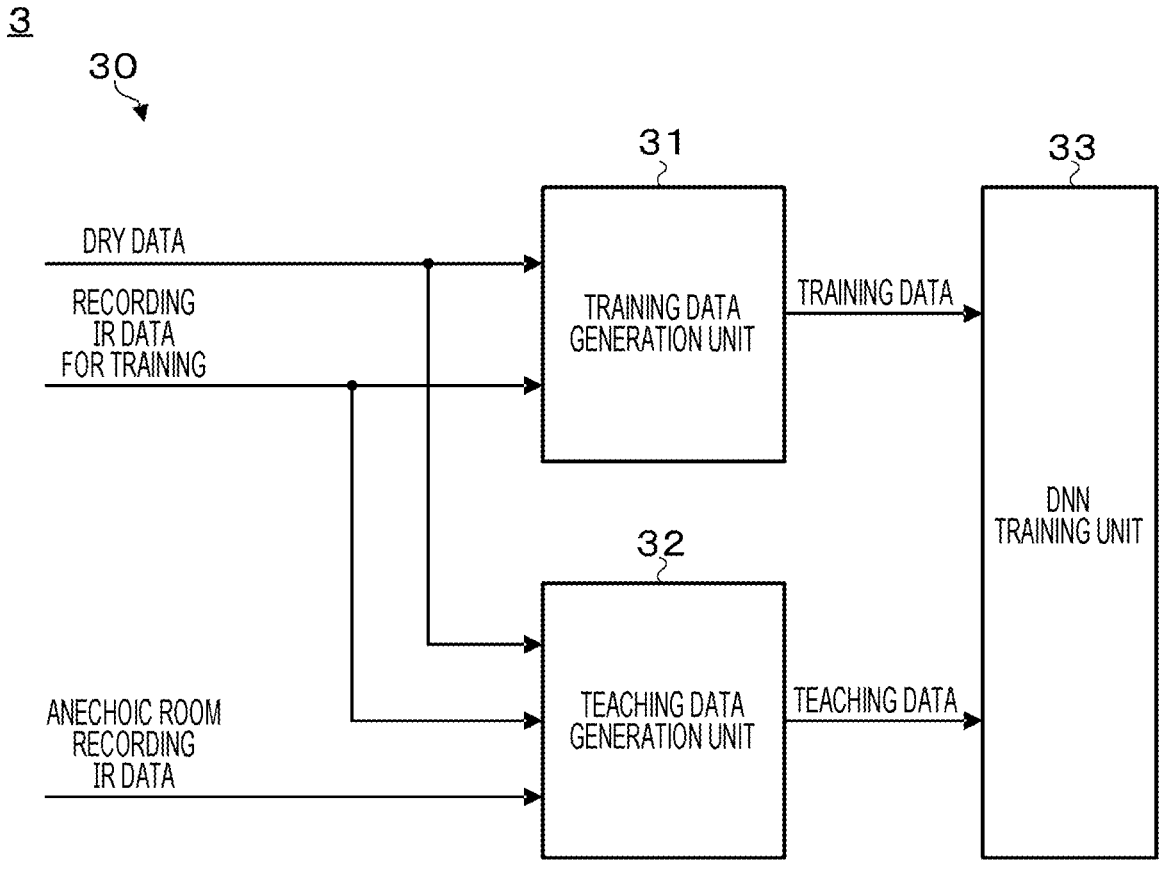
FIG. 2 is a diagram illustrating a configuration example of an information processing device according to the embodiment.

FIG. 2 is a diagram illustrating a configuration example of the information processing device 3 according to the embodiment. As described above, the information processing device 3 includes the training processing unit 30, and the training processing unit 30 includes a training data generation unit 31, teaching data generation unit 32, and a DNN training unit 33. Note that, in the following description, a case where a musician removes reverberation of a vocal signal recorded at home by using a smartphone will be described as an example.

The training data generation unit 31 generates training data for training (training sound source) by convolving recording IR data for training with dry data (dry sound source). The training data generated by the training data generation unit 31 is input to the DNN training unit 33. The dry data and the recording IR data for training are prepared in advance so as to be processable by the information processing device 3. These pieces of data are prepared while being stored in advance in, for example, a storage unit (not illustrated here) of the information processing device 3.

The dry data is a reference signal referred to during training. The dry data is a vocal sound having high sound quality and containing no reverberation recorded separately from the recording IR data for training (for example, a sound source recorded with professional equipment of a recording studio). Specifically, the high sound quality mentioned here has various characteristics (for example, frequency characteristics, noise characteristics, and the like) equal to or higher than a level at which commercial content can be produced, and has, for example, a sampling frequency of 48 KHz or higher (specifically, 96 kHz, 192 kHz, and the like). The dry data is prepared for, for example, a large quantity (for example, about 500 songs) of various vocal sounds (for example, songs of male, female, child, adult, Japanese, English, and the like) so as to be able to cope with dereverberation of a wide variety of vocal signals.

The recording IR data for training is a measurement signal representing acoustic characteristics collected and measured by using the smartphone at a musician's home. This smartphone is used for collecting the vocal signal (observation signal) described above. The measurement signal is, for example, an impulse response signal, and can be recorded by using a time stretched pulse (TSP) signal. Note that, the signal for measurement used for collecting the impulse response signal is not limited to the TSP signal, and other signals such as a maximum length sequence (M-sequence) signal may be used. In the recording IR data for training, for example, a large quantity (for example, about 300 songs) of impulse responses collected in various places (for example, various places in a work room or a living room) are prepared so as to be able to cope with dereverberation of vocal signals collected in various environments.

The teaching data generation unit 32 generates teaching data (teaching sound source) for training by using the dry data. The teaching data generated by the teaching data generation unit 32 is input to the DNN training unit 33. The DNN training unit 33 trains and constructs a learning model by a deep neural network (DNN) that performs dereverberation of a vocal signal by using the training data and the teaching data as input data.

Here, for example, the characteristics of the recording system in the smartphone can also be canceled by using the dry data as the teaching data, and recording with high sound quality can also be performed. However, in a case where the dry data is simply trained by using the teaching data as the training data, training of dereverberation is not performed, and only training with a level change can be performed. The reason is that a delay and a level of the dry sound source (target sound source) inherent in various kinds of training data do not coincide with the teaching data. This is because, since the training of the DNN proceeds in a direction in which an average error decreases, it is not possible to perform training up to essential dereverberation by focusing on causing these pieces of data to coincide with each other.

Therefore, the teaching data generation unit 32 generates the teaching data by adjusting the delay and level of the dry data by using the recording IR data for training and anechoic room recording IR data. The anechoic room recording IR data is a measurement signal (for example, impulse response signal) collected and measured in an anechoic room by using the smartphone used for collecting the vocal signal (observation signal). The anechoic room recording IR data is stored in advance and prepared in, for example, the storage unit of the information processing device 3.

The anechoic room recording IR data and the recording IR data for training described above are only required to be recorded by using the same recording system (for example, recording equipment such as a microphone) as the recording of the vocal signal (observation signal). It is preferable to actually use the recording system used for recording the vocal signal, and it is sufficient if the recording systems having the same recording characteristics including an allowable range are used. The recording system is not limited to the recording system of the same model, and, for example, a recording system of a different model may be used. In the recording system of the anechoic room recording IR data and the recording system of the recording IR data for training (for example, equipment such as a microphone and a speaker), the recording systems having the same characteristics are used.

Figure 3:
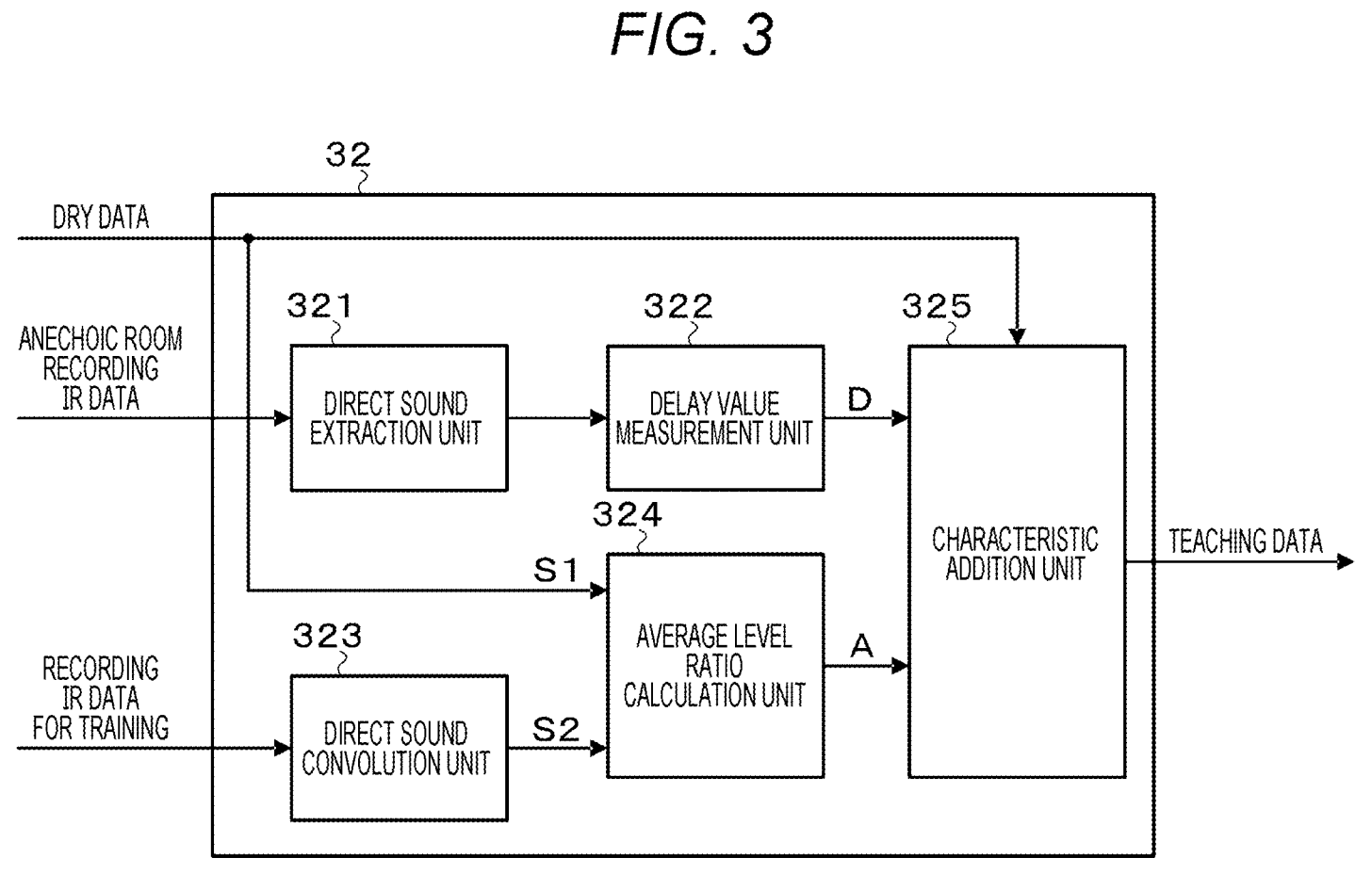

FIG. 3 is a diagram illustrating a configuration example of the teaching data generation unit 32. The teaching data generation unit 32 includes a direct sound extraction unit 321, a delay value measurement unit 322, a direct sound convolution unit 323, an average level ratio calculation unit 324, and a characteristic addition unit 325.

Figure 4:
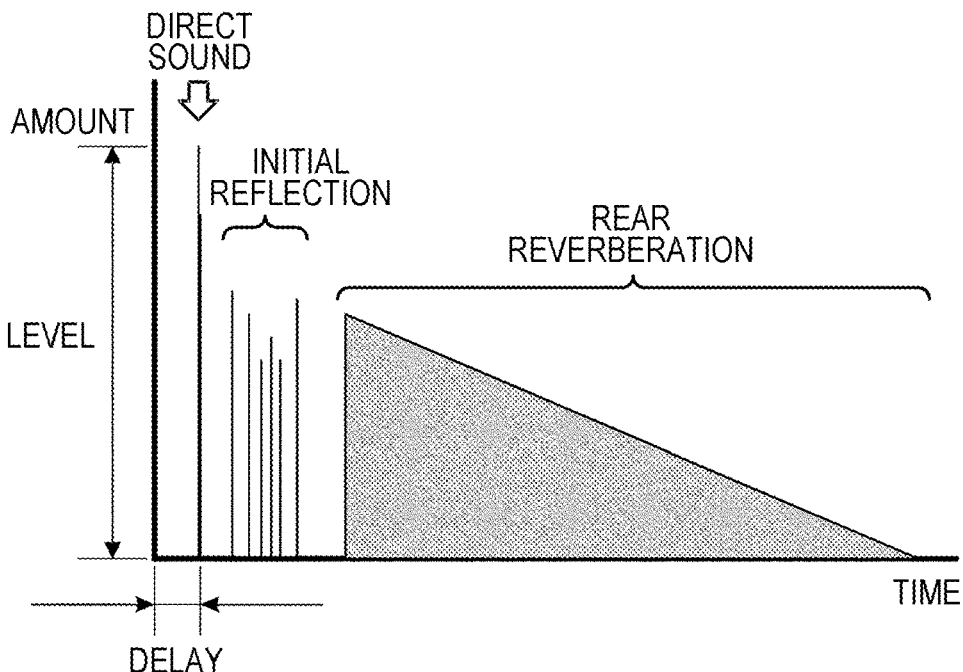
FIG. 4 is a diagram illustrating a waveform example of a general impulse response signal.
Figure 5:
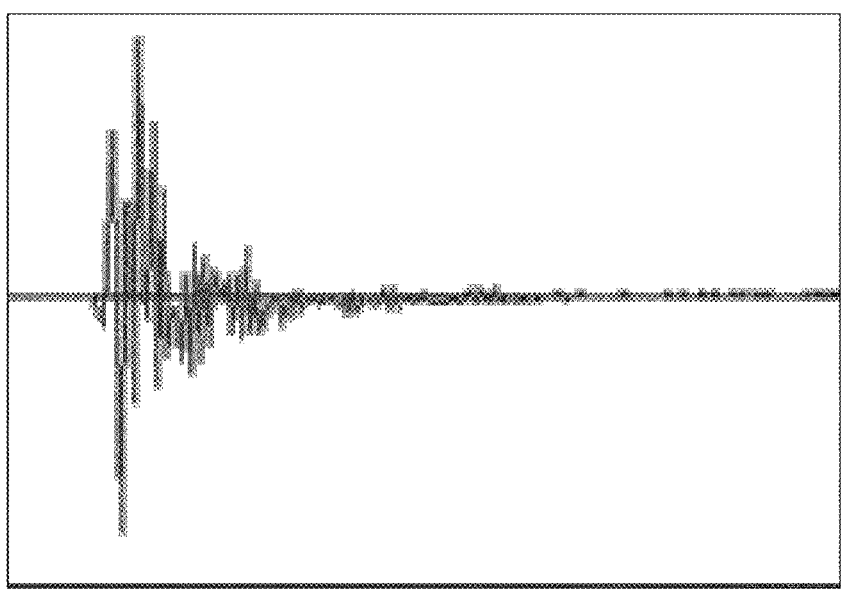
FIG. 5 is a diagram illustrating a waveform example of an impulse response signal in a case where sound is collected in an anechoic room by using a smartphone.

The direct sound extraction unit 321 extracts a direct sound component from the anechoic room recording IR data. The extraction of this direct sound component here will be described in detail. FIG. 4 is a waveform example of a general impulse response signal, and FIG. 5 is a waveform example of an impulse response signal in a case where sound is collected in the anechoic room by using the smartphone. In the drawing, a horizontal axis represents a time, and a vertical axis represents a level.

As illustrated in FIG. 4, in the general impulse response signal, waveforms appear in the order of direct sound (impulse), initial reflection, and rear reverberation. The initial reflection is reflected sound that a direct sound reaches by being reflected by a floor, a wall, a ceiling, or the like, and the rear reverberation is reverberation that attenuates while repeating the subsequent reflection. Since a general impulse response signal has such a waveform, the characteristics of the direct sound component included in the general impulse response signal are obtained by convolving a delay (specifically, a delay from output to detection) and a level of an impulse of the direct sound component with the dry data. Thus, the dry data can be trained as the teaching data.

Incidentally, the impulse response signal collected by the smartphone has a waveform as illustrated in FIG. 5, and the direct sound cannot be clearly separated. The reason why such a waveform is obtained is that equipment used for recording is also required to have flat characteristics in a processing band in order to obtain the waveform as illustrated in FIG. 4. In a case where sound is collected by the smartphone, the microphone of the smartphone is essential, and a speaker that can be carried and recorded at home has a narrower band than a speaker installed in a professional studio, and flatness thereof is not good. Therefore, the characteristics of the microphone of the smartphone, the speaker at the time of impulse measurement, and the like are added, and the waveform as illustrated in FIG. 5 is obtained. This is not limited to the sound collection on the smartphone.

Therefore, the direct sound extraction unit 321 estimates the direct sound component from the anechoic room recording IR data, and extracts the estimated direct sound component from the anechoic room recording IR data. Specifically, the direct sound extraction unit 321 cuts the anechoic room recording IR data into the number of actually required samples (N).

Figure 6:
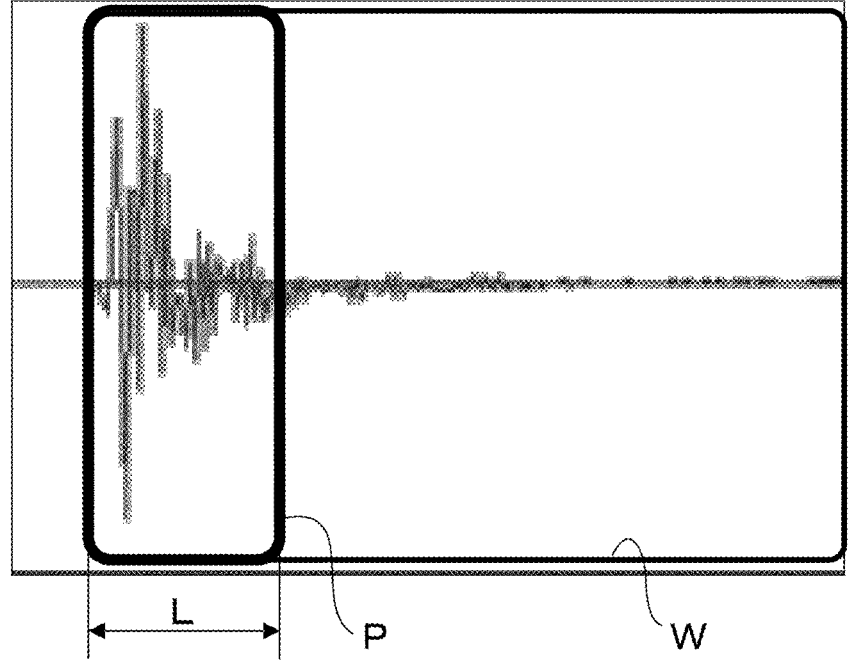
FIG. 6 is a diagram for describing an extraction example of a direct sound component of the impulse response signal collected in the anechoic room.

FIG. 6 is a diagram for describing an extraction example of the direct sound component of the impulse response signal collected in this anechoic room. For example, the direct sound extraction unit 321 cuts a length of the impulse response signal within a range in which there is no change in the frequency characteristics (an allowable error may be included). That is, the range in which the frequency characteristics do not change is estimated as the direct sound component. For example, a length L of an extraction portion P is adjusted such that the frequency characteristics of convolution of a whole W and frequency characteristics of convolution of the extraction portion P are the same. Then, portions other than the extraction portion P are cut, and the number of required samples (N) is extracted from the anechoic room recording IR data. The pieces of anechoic room recording IR data of the N samples are sent to the delay value measurement unit 322 illustrated in FIG. 3. Note that, the estimation and extraction of the direct sound component by the direct sound extraction unit 321 may be performed in advance. Furthermore, the number of required samples (N) may be set (stored) by manually estimating the direct sound components.

The delay value measurement unit 322 obtains a delay value (D) of the recording IR data for training by convolving the pieces of anechoic room recording IR data of the N samples with the dry data. FIG. 7 is a diagram for describing measurement of the delay value (D). The delay value measurement unit 322 obtains the delay value (D) by comparing the dry data (dry sound source) with a convolutional signal (convolutional sound source). The delay value (D) obtained in this manner is supplied to the characteristic addition unit 325.

On the other hand, the direct sound convolution unit 323 extracts the direct sound components from the pieces of recording IR data for training, and generates the convolution signal (convolutional sound source) by convolving the pieces of recording IR data for training of the extracted N samples with the dry data. FIG. 8 is a diagram for describing an extraction example of the direct sound component of the impulse response signal collected for training. As illustrated in the drawing, the direct sound convolution unit 323 extracts a head portion of the recording IR data for training (convolution IR). Specifically, the direct sound convolution unit 323 extracts the N samples described above. Then, the direct sound convolution unit 323 generates the convolution signal by convolving the pieces of recording IR data for training of the extracted N samples with the dry data. This convolution signal is sent to the average level ratio calculation unit 324 illustrated in FIG. 3.

As illustrated in FIG. 3, the average level ratio calculation unit 324 calculates an average level ratio (A) by using an average level of dry data S1 and an average level of a convolution signal S2 transmitted from the direct sound convolution unit 323. The average level ratio (A) is determined by the following Equation.

$$A=(S2 \text{ average level})/(S1 \text{ average level})$$

The obtained average level ratio (A) is supplied to the characteristic addition unit 325.

The characteristic addition unit 325 generates the teaching data by adjusting the delay and level of the dry data. Specifically, the characteristic addition unit 325 adds characteristics of the delay value (D) and the average level ratio (A) to the dry data.

FIG. 9 is a diagram for describing the characteristic addition. As illustrated in the drawing, a sound source without reverberation with high sound quality (dry data S1) is X(n), and an average level (original sound average level) thereof is Tref. Furthermore, an average level of the sound source (convolution signal S2) obtained by convolving the direct sound components of the pieces of recording IR data for training estimated and extracted as described above is Tconv, and the delay value (D) is A. At this time, a teaching sound source Y (n) used for training is obtained by the following Equation.

$$Y(n)=(\text{Tconv}/\text{Tref})\times X(n-\Delta)$$

Note that, (Tconv/Tref) is the average level ratio (A).

The teaching sound source (teaching data) generated in this manner is sent to the DNN training unit 33 illustrated in FIG. 2 and is used for training as described above. All combinations of the pieces of recording IR data for training and the dry data are trained by using the training sound source and the teaching sound source. Therefore, when the vocal signal is input, it is possible to output a processed signal obtained by removing reverberation and recording characteristics from the vocal signal.

Note that, training in the DNN training unit 33 may use time-axis data or frequency-axis data. In a case where the frequency-axis data is used, training may be performed including a phase, or only an amplitude value may be trained. The training of the amplitude value may use a linear amplitude value, or may use a value obtained by normalizing a dB value. In the latter case, training can be performed well even in the characteristics of reverberation in which the amplitude value decreases exponentially with the lapse of time. Furthermore, weighting may be performed with a linear amplitude value such that processing is efficiently performed on a signal having a larger level that is more easily listened to. Therefore, processing accuracy can be maintained without deterioration in sound quality, and good evaluation can be obtained not only numerically but also in subjective viewing.

2-3. Processing Flow Example

FIG. 10 is a flowchart illustrating a flow of the training processing by the information processing device 3. When the training processing is started, the information processing device 3 acquires necessary data such as the dry data and the recording IR data for training (step S1). Specifically, these pieces of data are acquired by reading from the storage unit or the like.

Then, the information processing device 3 generates the training data by the training data generation unit 31 described above (step S2). Furthermore, the information processing device 3 generates the teaching data by the teaching data generation unit 32. That is, the following processing is performed.

The information processing device 3 extracts the direct sound component from the anechoic room recording IR data by the direct sound extraction unit 321 (step S3). Next, the information processing device 3 causes the delay value measurement unit 322 to measure the delay value (D) (step S4).

Furthermore, the information processing device 3 extracts the direct sound components (specifically, N samples) from the piece of recording IR data for training by the direct sound convolution unit 323, and generates the convolution signal by convolving the extracted direct sound components with the dry data (step S5). Next, the information processing device 3 calculates the average level ratio (A) by the average level ratio calculation unit 324 (step S6). Then, the information processing device 3 generates the teaching data by adding the characteristics of the delay value (D) and the average level ratio (A) to the dry data by the characteristic addition unit 325 (step S7).

Finally, the information processing device 3 trains the learning model by the DNN using the training data and the teaching data as the input data by the DNN training unit 33, ends the processing, and constructs the learning model.

2-4. Hardware Configuration Example

Figure 11:
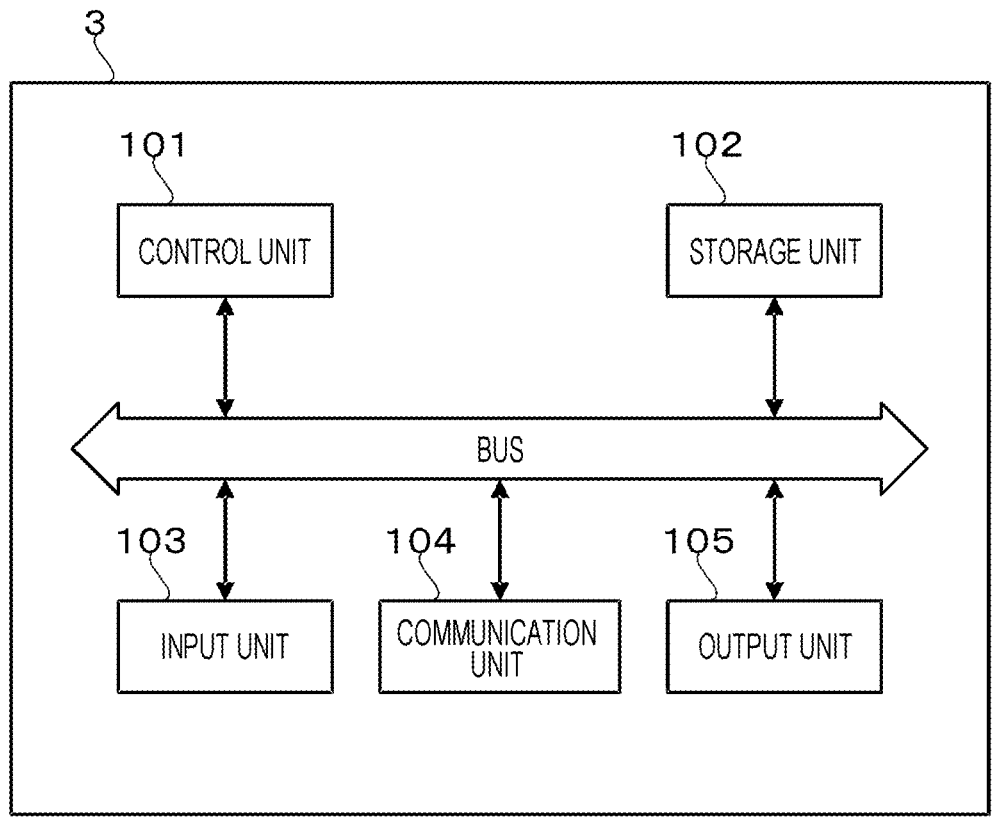
FIG. 11 is a diagram illustrating a hardware configuration example of the information processing device.

FIG. 11 illustrates a hardware configuration example of the information processing device 3 (computer). The information processing device 3 includes a control unit 101, a storage unit 102, an input unit 103, a communication unit 104, and an output unit 105 that are interconnected by a bus.

The control unit 101 includes, for example, a central processing unit (CPU), a random access memory (RAM), a read only memory (ROM), and the like. The ROM stores programs that are read and operated by the CPU, and the like. The RAM is used as a work memory of the CPU. The CPU controls the entire information processing device 3 by executing various kinds of processing according to the programs stored in the ROM and issuing commands. The control unit 101 executes, for example, the reverberation processing and the training processing described above.

The storage unit 102 is a storage medium including, for example, a hard disc drive (HDD), a solid state drive (SSD), a semiconductor memory, or the like, and stores data of programs (for example, applications) and the like in addition to content data such as image data, video data, sound data, text data. The storage unit 102 stores, for example, a program for causing the information processing device 3 to execute the various kinds of processing described above, and data such as the dry data, the anechoic room recording IR data, and the recording IR data for training.

Note that, these programs and data may not be stored in the storage unit 102. For example, a program or data stored in a storage medium readable by the information processing device 3 may be read and used. Examples of the storage medium include, for example, an optical disk, a magnetic disk, a semiconductor memory, an HDD, and the like attachable to and detachable from the information processing device 3. Furthermore, a program or data may be stored in a device connected to a network such as the Internet, and the information processing device 3 may read the program or data from the device and may use the program or data. The program may be, for example, a plug-in program that adds a part or all of the processing described above to an existing program.

The input unit 103 is a device for inputting various kinds of information to the information processing device 3. When information is input by the input unit 103, the control unit

101 performs various kinds of processing corresponding to the input information. In addition to a mouse and a keyboard, the input unit 103 may be a touch panel, a touch screen integrally formed with a monitor, a physical button, or the like. The input unit 103 may be a sensor such as a microphone. Note that, various kinds of information may be input to the information processing device 3 via the communication unit 104 as described later.

The communication unit 104 is a communication module that communicates with other devices and the Internet according to a predetermined communication standard. Communication methods include a wireless local area network (LAN) such as Wireless Fidelity (Wi-Fi), 4th generation mobile communication system (4G), broadband, Bluetooth (registered trademark), and the like.

The output unit 105 is a device for outputting various kinds of information from the information processing device 3. The output unit 105 is a display that displays an image or a video, a speaker that outputs sound, or the like. Note that, the various kinds of information may be output from the information processing device 3 via the communication unit 104.

2-5. Conclusion

In the present embodiment, the training data is generated by convolving the measurement signal (for example, impulse response signal) collected by the microphone of the smartphone used for collecting the vocal signal (observation signal) with the dry data (reference signal) having higher sound quality and no reverberation than the vocal signal. Furthermore, the teaching data is generated by adapting, to the dry data, the average level and the delay value of the convolution signal generated by convolving the direct sound component of the measurement signal with the dry data. Then, the learning model for performing the dereverberation of the vocal signal is trained by using the generated training data and teaching data as the input data.

As described above, due to the use of the teaching data in which the delay and level of the dry data are adjusted to match the training data, even though recording is performed in a place where there is reverberation, such as a living room at home, the reverberation can be removed in consideration of the sound quality. A reverberation component is removed, and thus, it is possible to allow a studio engineer or the like to freely add reverberation optimal for content.

Since the recording of the measurement signal is performed by using the recording system (specifically, smartphone) used for recording the vocal sound, the characteristics of the recording system can be canceled. Therefore, recording with high sound quality can be performed without using an expensive professional microphone. For example, in a case where recording is performed with the smartphone, recording can be performed only with the smartphone without using expensive recording professional equipment.

Furthermore, training based on pieces of dry data of a large quantity of various vocal sounds is performed, and thus, dereverberation processing can be performed regardless of vocalists. Furthermore, pieces of recording IR data for training are collected at various places where the vocal sound is estimated to be collected, dereverberation processing can be performed regardless of places. Accordingly, dereverberation in consideration of sound quality can be performed regardless of recording environments.

3. Modification Example

Although the embodiment of the present disclosure is heretofore described specifically, the present disclosure is not limited to the above-described embodiment, and various modifications based on the technical idea of the present disclosure can be made. For example, various modifications to be described below can be made. Furthermore, one or a plurality of any selected aspects can be appropriately combined. Furthermore, configurations, methods, processes, shapes, materials, numerical values, and the like of the above-described embodiment can be combined and replaced with each other without departing from the gist of the present disclosure. Furthermore, it is also possible to divide one element into two or more elements, and it is also possible to combine two or more elements into one element. Moreover, it is also possible to omit a part thereof.

In the above-described embodiment, an example of removing the reverberation of the vocal sound and the recording characteristics in the music production has been described, but the sound of the removal target (observation signal) of the reverberation and the recording characteristics is not limited thereto, and any sound may be used as long as the reverberation is to be removed. For example, the sound may be sound for other music production, such as sound of each music instrument of orchestras. Furthermore, the content is not limited to the music content, and may be, for example, content such as a movie, a television program, a game, or a guide broadcast. In this case, for example, the present disclosure can be applied to removal of reverberation of sound and recording characteristics such as narration, audio dubbing (post recording), an inserted song, and announcement. Furthermore, the present disclosure can also be applied to sound such as a voice recorder, an online conference system, a translation machine, and a car navigation system. In these cases, a sound source corresponding to the sound as the removal target of the reverberation is only required to be set as the dry data.

Furthermore, in the above-described embodiment, although the dry data having high sound quality and containing no reverberation is used as the reference signal, the reference signal is not limited thereto, and may be any sound as long as the sound is a target of training. For example, in a case where the reference signal is obtained by performing recording with the sound having sound quality higher than the vocal signal (observation signal), the sound quality of the processed signal can be improved. Furthermore, for example, processing of intentionally adding reverberation to the observation signal by using the reference signal including reverberation may be performed. That is, the present disclosure may be applied to reverberation processing other than dereverberation.

Furthermore, in the above-described embodiment, although the home is assumed as the sound collection place of the vocal signal and the smartphone is assumed as the recording equipment, the recording environment (place, equipment, and the like) is not limited thereto, and may be any environment. For example, the sound collection place may be a family, relative, or acquaintance's home, an individual studio, a music room, a car interior, a rental space, an event hall, a karaoke room, or the like. In this case, the recording IR data for training is only required to be collected at a place where sound collection is assumed. Furthermore, for example, the microphone for sound collection may be a microphone attached to a headset, a tablet, a notebook computer, a smart appliance, a video camera, or the like, a desk-top microphone, a handy microphone, or the like regardless of types. In this case, the user equipment 2 may include these devices.

Furthermore, in the above-described embodiment, although one type of microphone (specifically, the microphone of the smartphone) is assumed as the microphone used for sound collection, a plurality of types of microphones (for example, smartphones of a plurality of manufacturers) may be used for sound collection. In this case, the measurement signal may be collected for each microphone. Therefore, dereverberation can be appropriately performed in accordance with the microphone to be used.

Furthermore, although it has been described that the information processing device 3 in the above-described embodiment has the function of removing the reverberation and the characteristics of the recording system (hereinafter, referred to as the dereverberation technology), for example, this dereverberation technology can also be used for a new music production technology. Hereinafter, details of each configuration will be described.

An earnings model is changing from package media to live in music production, particularly pop music. In the recording of a music live show, each sound source is basically recorded as a separate track. For example, an acoustic sound source (for example, vocal, drum, and the like) is recorded by using a microphone, and an electronic musical instrument (for example, a keyboard or the like) records an output thereof as it is (directly from the musical instrument without using the microphone). Furthermore, separately, a plurality of audience microphones is generally used in order to record reverberation of a venue, cheers of an audience, and the like.

For example, in the case of pop music, a sound source position of an acoustic sound source (in particular, vocal) is extremely close to a microphone, or a dynamic microphone is mainly used, and an extremely dry sound source containing not much reverberation is often recorded in many cases. Therefore, in the related art, in order to match the sound source (for example, a microphone signal) with the atmosphere of the venue, the signal of the audience microphone described above was mixed to obtain the reverberation component in many cases. As described above, in the production of a live sound source, the atmosphere of the venue is generally added by using a plurality of audience microphones in order to record the reverberation of the venue, the cheers of the audience, and the like and mixing the signals to each sound source as necessary.

Incidentally, in recent years, since correction processing such as pitch correction is frequently performed on a sound source before mixing (particularly, vocal sound source), when the signal of the audience microphone is mixed with a sound source after the processing, a problem such as double sound is caused. In this case, the signal of the audience microphone cannot be used, and the engineer separately considers (for example, artificially generates) reverberation matching the sound of the venue, and generates sound by using the reverberation. Therefore, it is difficult to accurately reproduce the sound of the venue, and there has been a problem in work efficiency.

The dereverberation technology described above can be used, for example, for adding reverberation in such a case. That is, due to the use of the dereverberation technology described above, it is possible to add an actual sound of the venue without mixing the signal of the audience microphone as described above by reversely extracting and estimating features of the reverberation of the venue and adding this effect to the sound source such as the vocal.

Specifically, first, the dereverberation of the signal of the audience microphone is performed by using the dereverberation technology described above, and the reverberation component is extracted from the signal. Next, the reverberation characteristics of the venue are reversely generated from the extracted reverberation component. Then, reverberation is added to the sound source (for example, corrected sound source such as vocal and guitar) by using the generated reverberation characteristics as, for example, a coefficient for reverberation addition. As a result, the actual reverberation of the venue can be added to the sound source. Hereinafter, a detailed description will be given with reference to the drawings.

Configuration Example at the Time of Recording

Figure 12:
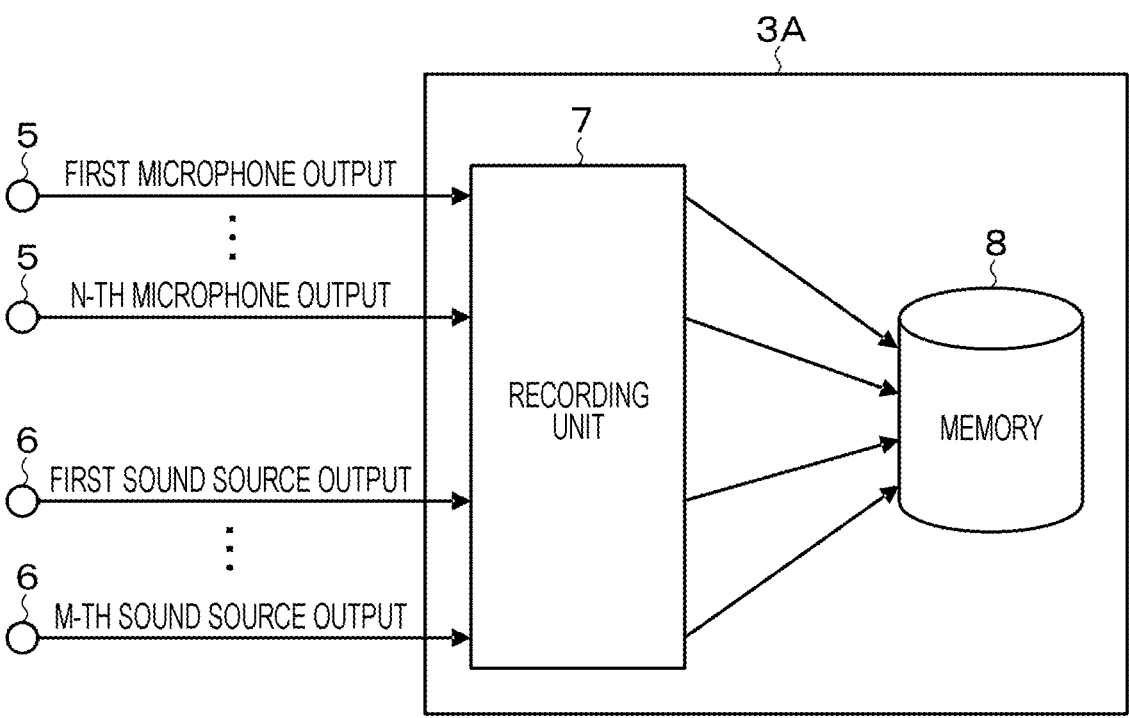
FIG. 12 is a diagram illustrating a configuration example of an information processing system at the time of recording according to a modification example.

FIG. 12 illustrates a configuration example of an information processing system (information processing system 1A) according to a modification example. Note that, FIG. 12 illustrates a configuration example at the time of recording. The information processing system 1A is, for example, a system for music production. The information processing system 1A includes an information processing device 3A, a plurality of (first to N-th) microphones 5, and a plurality of (first to M-th) sound source output units 6. Note that, in the case of general live recording, as illustrated in the drawing, the plurality of microphones 5 and the plurality of sound source output units 6 are used, but these microphones and sound source output units may be singular.

The information processing device 3A records and edits various sound sources, sounds, and the like. The information processing device 3A has, for example, a hardware configuration similar to the information processing device 3 of the above-described embodiment (see FIG. 11). For example, the information processing device 3A realizes music production by a digital audio workstation (DAW). The information processing device 3A is connected to the respective microphones 5 and the respective sound source output units 6 via an audio interface (not illustrated) such as a mixer, for example.

The microphones 5 collect sounds of the venue (sounds in a place where reverberation to be added occurs) such as sounds of the venue such as voices of the audience, and outputs the sounds as the microphone signal. The microphone 5 is, for example, a directional audience microphone, and is installed to collect sounds in various places in the venue. As the microphone 5, for example, a pair of microphones 5 for an L channel and an R channel are installed at a plurality of places with different targets of sound collection places so as to collect sounds at a guest seat near a stage, a guest seat far from the stage, an upper side of the guest seat, and the like. Output signals (first to N-th microphone outputs) of the respective microphones 5 are input to the information processing device 3A.

The sound source output unit 6 outputs a sound source signal (sound source data). The sound source output unit 6 includes, for example, a microphone that collects sound of a sound source such as a vocal, a drum, or a piano and outputs the sound as the microphone signal, a musical instrument (for example, a keyboard) that can directly output (line output) the sound source signal, or the like. The output signals (first to M-th sound source outputs) of the respective sound source output units 6 are input to the information processing device 3A.

The information processing device 3A includes a recording unit 7 and a memory 8. The recording unit 7 records each signal input from each microphone 5 and each sound source output unit 6 in the memory 8. For example, the recording unit 7 includes an analog-to-digital converter (ADC) and the like, converts each signal input from each microphone 5 and each sound source output unit 6 into each recording data, and stores the recording data in the memory 8.

The memory 8 includes, for example, a storage device such as an HDD or an SSD, and stores the recording data converted by the recording unit 7. Note that, it is sufficient if the memory 8 can record recording data, and may be, for example, an optical disk such as a digital versatile disc (DVD), an attachable and detachable recording medium such as a portable semiconductor memory, or the like.

Configuration Example at the Time of Editing

Figure 13:
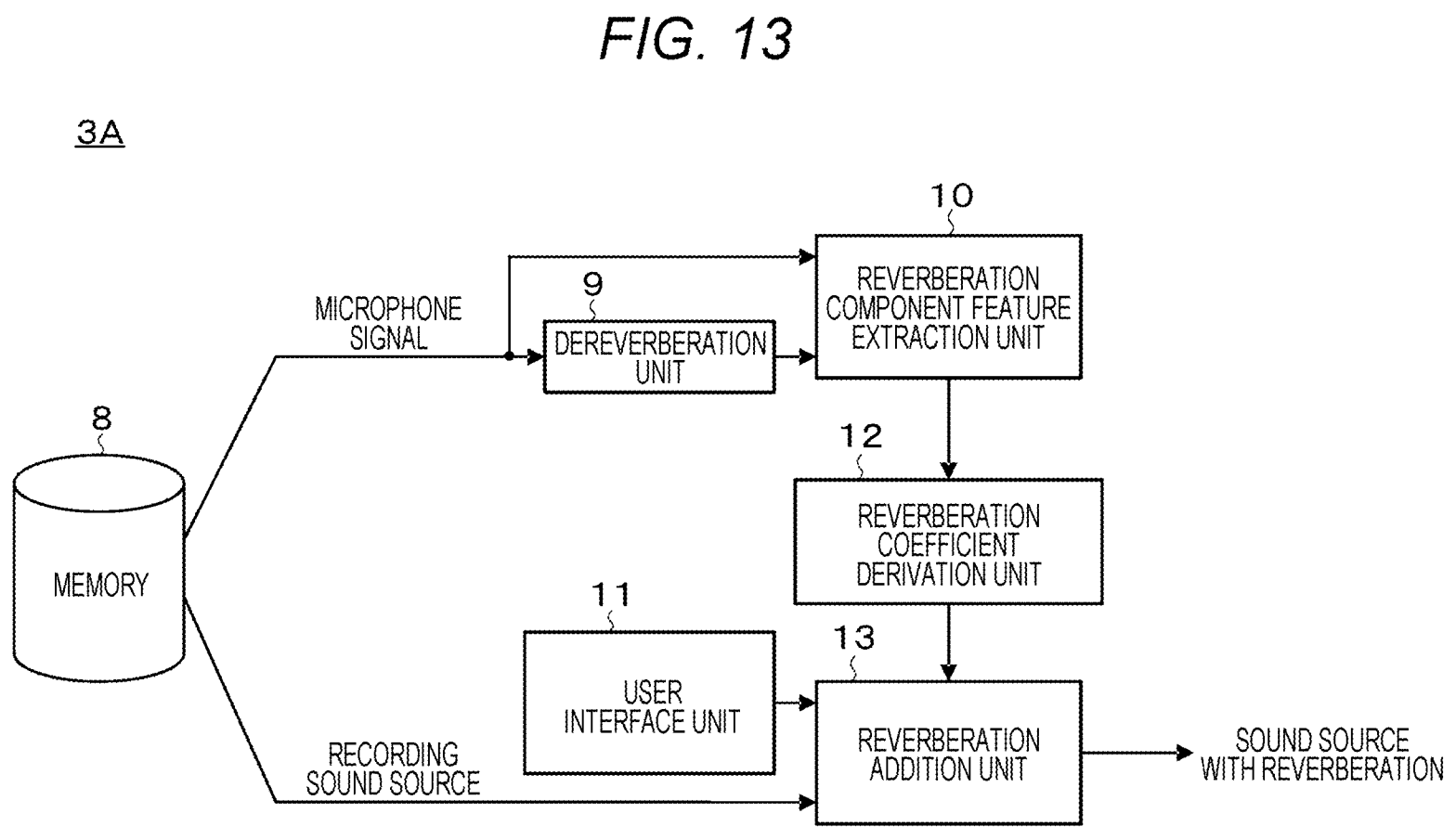

FIG. 13 illustrates a configuration example at the time of editing. Note that, in the present modification example, the same information processing device 3A is used at the time of recording and at the time of editing, but different information processing devices may be used. In a case where different devices are used at the time of recording and at the time of editing, for example, it is sufficient if recording data recorded in a recording side device can be used in an editing side device by data communication, the attachment and detachment of the recording medium, or the like.

The information processing device 3A has a function of adding reverberation (including sounds of the venue such as voices of audience, applause, and the like) to the recording sound source. The information processing device 3A includes a dereverberation unit 9, a reverberation component feature extraction unit 10, a user interface unit 11, a reverberation coefficient derivation unit 12, and a reverberation addition unit 13.

The dereverberation unit 9 performs dereverberation by the dereverberation technology described above. The information processing device 3A has, for example, the learning model trained (see FIGS. 2, 3, and the like) described in the embodiment, and the dereverberation unit 9 can use the learning model.

Specifically, this learning model is obtained by performing machine learning in advance by using first data (training data) generated by convolving first acoustic data (measurement signal) collected by a predetermined microphone 5 (see FIG. 12) with the dry data (reference signal) containing no reverberation and second data (teaching data) generated by adapting, to the dry data (reference signal), the average level and the delay value of the convolution signal generated by convolving the direct sound component of the first acoustic data (measurement signal) with the dry data (reference signal).

Figure 14:
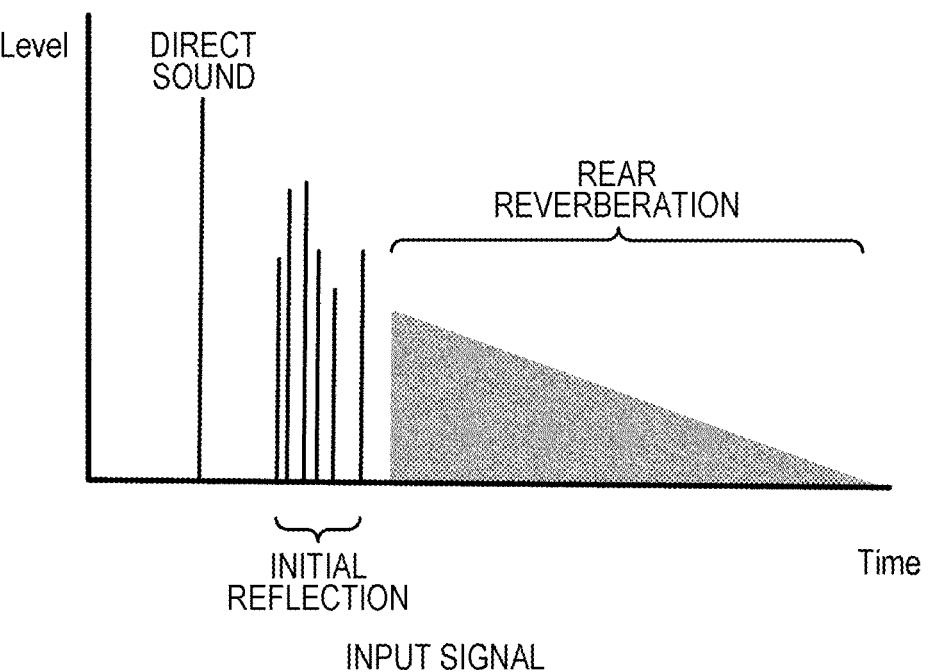
FIG. 14 is a diagram illustrating a waveform example of an input signal.
Figure 15:
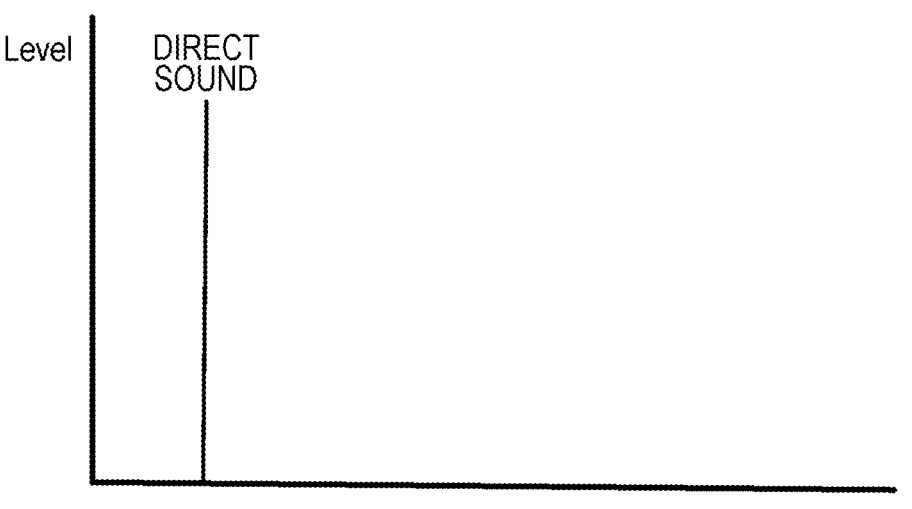
FIG. 15 is a diagram illustrating a waveform example of a dereverberation signal.

Due to the use of this learning model, the dereverberation unit 9 inputs the second acoustic data (observation signal) collected by the predetermined microphone 5 described above, and outputs third acoustic data obtained by removing the reverberation component from the second acoustic data (observation signal). To describe in an easy-to-understand manner, the dereverberation unit 9 inputs the microphone signal of the predetermined microphone 5 described above recorded in the memory 8, performs the dereverberation of the input microphone signal (for example, input signal having the characteristics illustrated in FIG. 14) by using the learning model described above, and outputs the signal obtained by removing reverberation (for example, dereverberation signal having the characteristics illustrated in FIG. 15). The third acoustic data (dereverberation signal) output by the dereverberation unit 9 is input to the reverberation component feature extraction unit 10.

Figure 16:
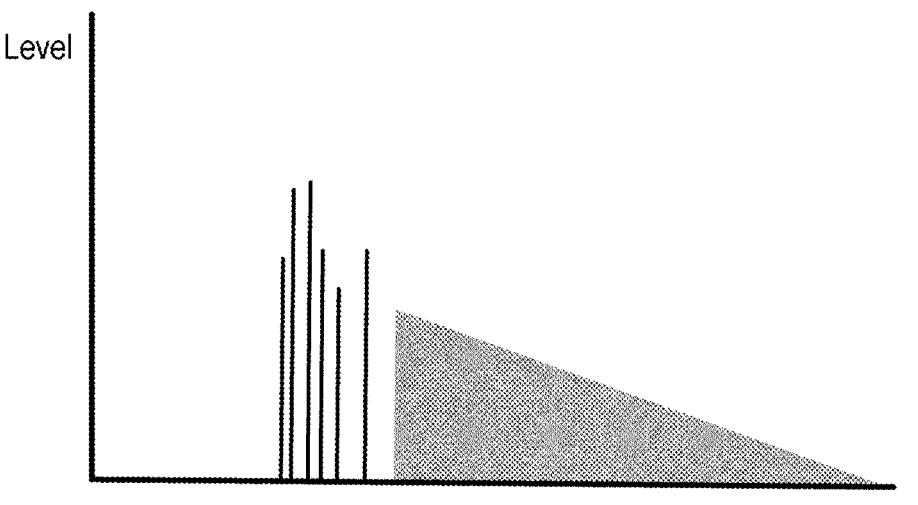
FIG. 16 is a diagram illustrating a waveform example of a reverberation component.

The reverberation component feature extraction unit 10 extracts feature data representing the reverberation component of the second acoustic data by using the second acoustic data and the third acoustic data. This feature is, for example, a feature of the impulse response. The reverberation component feature extraction unit 10 inputs the microphone signal of the predetermined microphone 5 described above stored in the memory 8 (original signal before the dereverberation by the dereverberation unit 9), extracts a difference between the microphone signal and the dereverberation signal input from the dereverberation unit 9 to calculate the feature of the reverberation component (for example, reverberation component of the characteristic illustrated in FIG. 16), and generates feature data indicating the calculated feature. The feature data extracted (generated) by the reverberation component feature extraction unit 10 is input to the reverberation coefficient derivation unit 12.

The user interface unit 11 generates control data corresponding to a user operation. The user interface unit 11 includes, for example, an input device such as a keyboard, a mouse, and a physical button, and the engineer actually listens to and uses the sound. The user interface unit 11 is used for allowing the user to control the setting for adding the reverberation in the reverberation addition unit 13. For example, as the setting for adding the reverberation, there are wet and dry level adjustment and the like. Specifically, the user interface unit 11 generates control data (control data for additional setting) for controlling settings of a reverberation time (for example, 1 second or the like), a reverberation amount (for example, −40 dB or the like), and the like. The control data generated by the user interface unit 11 is input to the reverberation addition unit 13.

The reverberation coefficient derivation unit 12 (characteristic determination unit) determines the characteristics of the reverberation to be added to the sound source data by the reverberation addition unit 13. Note that, in the present configuration example, the characteristics are determined as the characteristics of the reverberation component extracted by the reverberation component feature extraction unit 10. Specifically, the reverberation coefficient derivation unit 12 converts the feature data input from the reverberation component feature extraction unit 10 into coefficient data available in the reverberation addition unit 13 in the subsequent stage. The coefficient data converted by the reverberation coefficient derivation unit 12 is input to the reverberation addition unit 13.

The reverberation addition unit 13 adds the reverberation to the sound source data and outputs the sound source data. The reverberation addition unit 13 inputs the sound source data (for example, sound source data after the correction processing such as the pitch correction described above) from the memory 8, adds reverberation based on the feature data extracted (generated) by the reverberation component feature extraction unit 10 to the input sound source data, and outputs the sound source data. Specifically, the reverberation addition unit 13 synthesizes the reverberation component having the characteristics of the feature data described above with the input sound source data by using the coefficient data input from the reverberation coefficient derivation unit 12. At this time, the reverberation addition unit 13 changes the setting for adding the reverberation in accordance with the control data input from the user interface unit 11.

Note that, the sound source data to which the reverberation is added is not limited to the sound source data recorded at the time of recording described above, and sound source data separately prepared may be used. Since the sound production is performed such that a listening method is not different depending on the place, it is considered that the sound source listening to at the live venue is not optimal for music production. In such a case, music production is performed by individually preparing sound sources, but this case can also be coped with. The sound source data with reverberation output from the reverberation addition unit 13 is stored in, for example, the memory 8 and is used for music production and the like.

As described above, in the present modification example, first, the dereverberation unit 9 inputs the second acoustic data collected by the predetermined microphone 5 described above and outputs the third acoustic data obtained by removing the reverberation component from the second acoustic data by using learning model obtained by performing machine learning by using the first data generated by convolving the first acoustic data collected by the predetermined microphone 5 with the dry data containing no reverberation and the second data generated by adapting, to the dry data, the average level and the delay value of the convolution signal generated by convolving the direct sound component of the first acoustic data with the dry data.

Next, the reverberation component feature extraction unit 10 extracts the feature data representing the reverberation component of the second acoustic data by using the second acoustic data and the third acoustic data. Thereafter, the reverberation addition unit 13 inputs the sound source data, adds the reverberation of the characteristic (specifically, the characteristics represented by the feature data) based on the feature data to the input sound source data, and outputs the sound source data.

Therefore, the actual sound of the venue can be added without mixing the signal of the audience microphone to the recording sound source as described above. Therefore, even though the reverberation is added, a problem that sound is doubly listened to does not occur as described above. Accordingly, it is not necessary to consider and add similar reverberation, and the man-hours of the engineer can be greatly reduced. Furthermore, the dereverberation unit 9 uses the dereverberation technology of the embodiment described above. Accordingly, sound quality is improved, and accurate dereverberation can be performed. As a result, more accurate processing can be performed.

Another Configuration Example at the Time of
Editing

Figure 17:
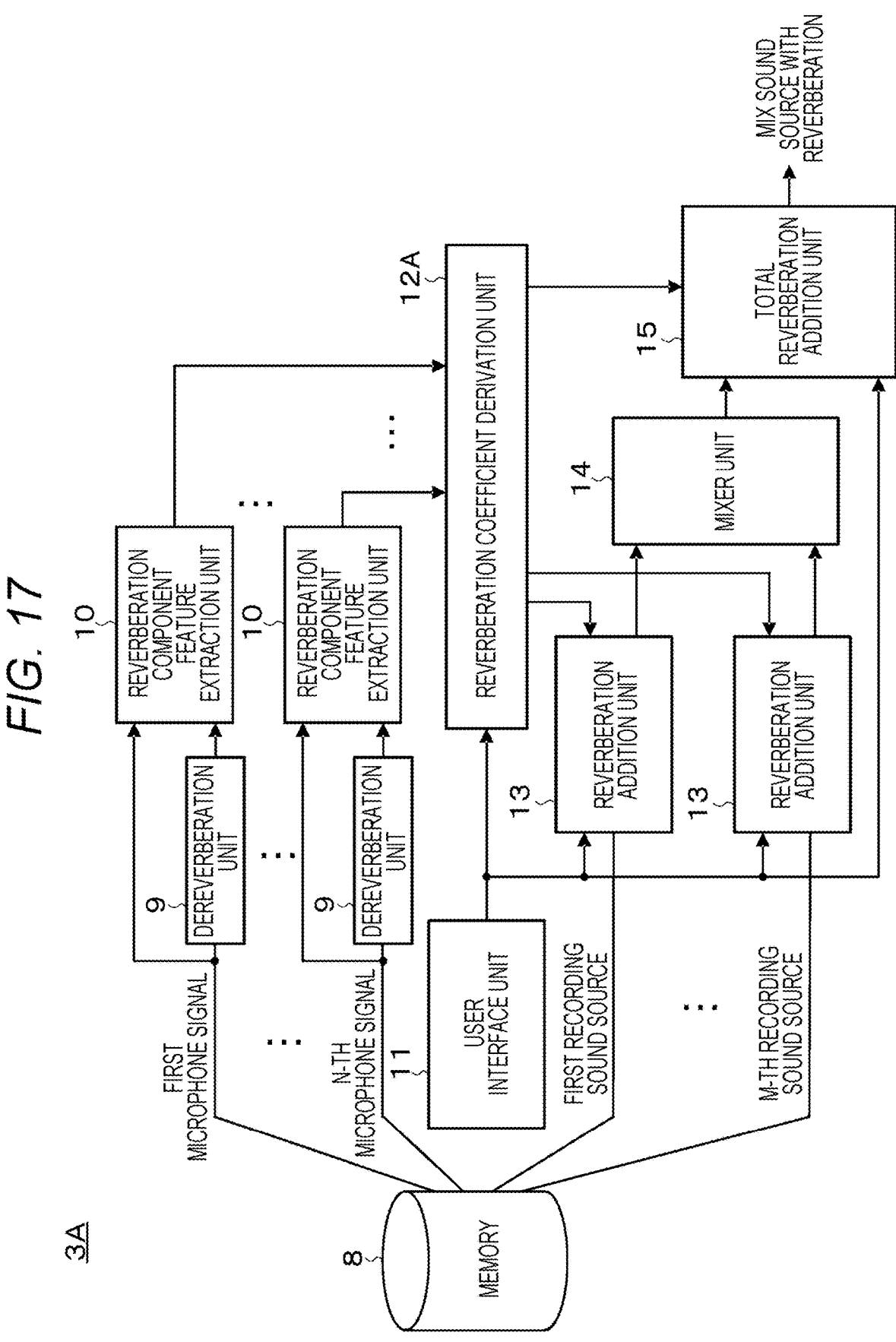
FIG. 17 is a diagram illustrating another configuration example of the information processing device at the time of editing according to the modification example.

FIG. 17 illustrates another configuration example at the time of editing. Note that, in the description of the present configuration example, the same reference signs are given to the same or similar configurations as the configurations in the above description, and redundant description will be appropriately omitted.

The information processing device 3A in the present configuration example includes a memory 8, a plurality of (first to N-th) dereverberation units 9, a plurality of (first to N-th) reverberation component feature extraction units 10, a user interface unit 11, a reverberation coefficient derivation unit 12A, a plurality of (first to M-th) reverberation addition units 13, a mixer unit 14, and a total reverberation addition unit 15. Note that, the number of each of the dereverberation units 9, the reverberation component feature extraction units 10, and the reverberation addition units 13 may be changed as appropriate.

The respective dereverberation units 9 input the pieces of second acoustic data (first to N-th microphone signals in the drawing) collected by the respective microphones 5 (see FIG. 12), respectively, and output the pieces of third acoustic data obtained by removing the reverberation components from the pieces of second acoustic data, respectively. For example, the first dereverberation unit 9 inputs the first microphone signal collected and recorded by the first microphone 5 from the memory 8, and outputs the dereverberation signal obtained by removing the reverberation from the input first microphone signal. Note that, the first dereverberation unit 9 uses the learning model obtained by performing machine learning by using the first acoustic data (measurement signal) collected by the first microphone 5. The same applies to the second to N-th dereverberation units 9.

The pieces of third acoustic data output by the respective dereverberation units 9 are input to the corresponding reverberation component feature extraction units 10, respectively. For example, the third acoustic data output from the first dereverberation unit 9 is input to the first reverberation component feature extraction unit 10.

The respective reverberation component feature extraction units 10 extract the pieces of feature data representing the reverberation components of the pieces of second acoustic data by using the pieces of second acoustic data and the pieces of third acoustic data, respectively. For example, the first reverberation component feature extraction unit 10 inputs the first microphone signal from the memory 8, and extracts the feature data representing the reverberation component of the first microphone signal by using the input first microphone signal and the dereverberation signal output from the first dereverberation unit 9. The feature data extracted by each reverberation component feature extraction unit 10 is input to the reverberation coefficient derivation unit 12A.

As described above, the user interface unit 11 generates the control data corresponding to the user operation, and is used for allowing the user to control each setting for adding the reverberation in each of the plurality of reverberation addition units 13 and the total reverberation addition unit 15. Specifically, the user interface unit 11 generates control data (control data for additional setting) for controlling each setting for adding the reverberation. This control data is input to the plurality of corresponding reverberation addition units 13 and the total reverberation addition unit 15.

Furthermore, the user interface unit 11 in the present configuration example is used for allowing the user to control selection of characteristics in the reverberation coefficient derivation unit 12A as described later. Specifically, the user interface unit 11 generates control data (control data for characteristic selection) for controlling the selection of the characteristics. This control data is input to the reverberation coefficient derivation unit 12A.

The reverberation coefficient derivation unit 12A (characteristic determination unit) determines the characteristics of the reverberation to be added to the sound source data in each of the plurality of reverberation addition units 13 and the total reverberation addition unit 15. For example, the reverberation coefficient derivation unit 12A selectively determines each of the characteristics by using the feature data extracted by each of the plurality of reverberation component feature extraction units 10. Specifically, the reverberation coefficient derivation unit 12A selects the characteristics of the reverberation to be added to the sound source data in accordance with the control data (control data for characteristic selection) input from the user interface unit 11.

For example, the reverberation coefficient derivation unit 12A determines the characteristics of the feature data selected from among the pieces of feature data extracted by the plurality of reverberation component feature extraction units 10, respectively, to be the characteristics of the reverberation to be added to the sound source data. That is, the reverberation coefficient derivation unit 12A selects the characteristics to be added to the sound source data by each of the plurality of reverberation addition units 13 and the total reverberation addition unit 15 from among the pieces of feature data extracted by the plurality of reverberation component feature extraction units 10, respectively. Then, the reverberation coefficient derivation unit 12A outputs the coefficient data of the selected feature data to the plurality of corresponding reverberation addition units 13 and the total reverberation addition unit 15. For this reason, for example, it is sufficient if each piece of feature data is expanded as each coefficient data as described above and is used in each of the plurality of reverberation addition units 13 and the total reverberation addition unit 15 in the subsequent stage.

Note that, the reverberation coefficient derivation unit 12A may, for example, determine average characteristics of the features represented by the pieces of feature data extracted by the plurality of reverberation component feature extraction units 10, respectively, to be the characteristics of the reverberation to be added to the sound source data, and may output the coefficient data to which the reverberation of the determined characteristics is added to the plurality of corresponding reverberation addition units 13 and the total reverberation addition unit 15. As the average characteristics, an average feature of the features represented by the respective pieces of feature data may be used as a representative value, or not only one representative value is used, but also the features can be by performing processing such as partial averaging in several patterns such as weak, medium, and strong. That is, the characteristics of the reverberation to be added may be selected from among a plurality of candidates by using the partial average of the features. This selection can be performed, for example, in accordance with the control data (control data for characteristic selection) described above.

Each coefficient data generated and output by the reverberation coefficient derivation unit 12A is input to the plurality of corresponding reverberation addition units 13 and the total reverberation addition unit 15. Each reverberation addition unit (reverberation addition unit for each sound source) 13 inputs each sound source data (for example, sound source data after the correction processing described above) from the memory 8, adds the reverberation to each input sound source data, and outputs the sound source data with reverberation. The sound source data with reverberation output by each reverberation addition unit 13 is input to the mixer unit 14. The mixer unit 14 inputs and synthesizes the sound source data with reverberation output from each of the plurality of reverberation addition units 13. The mixed sound source data synthesized by the mixer unit 14 is output to the total reverberation addition unit 15.

The total reverberation addition unit 15 adds the reverberation to the mixed sound source data and outputs the mixed sound source data. The total reverberation addition unit 15 inputs the mixed sound source data after synthesis by the mixer unit 14, adds the reverberation based on the feature data extracted (generated) by each of the plurality of reverberation component feature extraction units 10 to the input mixed sound source data, and outputs the sound source data. Specifically, in a similar manner to the reverberation addition unit 13, the total reverberation addition unit 15 synthesizes the reverberation component with the mixed sound source data by using the coefficient data input from the reverberation coefficient derivation unit 12A. The mixed sound source data with reverberation output from the total reverberation addition unit 15 is stored in, for example, the memory 8.

The present configuration example has the following effects in addition to the effects illustrated in FIG. 13. The plurality of pieces of feature data can be used by the respective kinds of processing by using the second acoustic signals collected by the plurality of microphones 5, respectively. The characteristics of the reverberation recorded change depending on a type, an attachment place, a direction, and the like of the microphone 5. Therefore, a plurality of pieces of feature data representing reverberation components having slightly different characteristics is input to the reverberation coefficient derivation unit 12A. Therefore, the number of options for reverberation characteristics to be added to the sound source data is increased, and thus, the engineer can select the sound quality from among these options. That is, various sounds (real sounds) in the venue can be used, and the range of expressions of the engineer can be expanded.

Furthermore, the reverberation can be added for each sound source by including the plurality of reverberation addition units 13, and the reverberation can also be added to the mixed sound source data obtained by mixing the respective pieces of reverberated sound source data by including the mixer unit 14 and the total reverberation addition unit 15. Accordingly, it is possible to realize fine reverberation addition according to an actual situation, for example, such as a case strong and short reverberation is given to the individual sound source and weak and long reverberation is given to the mixed sound source.

Note that, the present disclosure may also have the following configuration.

(1)

An information processing device including: a training processing unit that generates training data by convolving a measurement signal representing acoustic characteristics collected by a same sound collection unit as a sound collection unit used for collecting an observation signal with a reference signal having sound quality and reverberation characteristics different from the observation signal, generates teaching data by adapting, to the reference signal, an average level and a delay value of a convolution signal generated by convolving a direct sound component of the measurement signal with the reference signal, and trains a learning model for performing reverberation processing of the observation signal collected by the sound collection unit by using the training data and the teaching data as input data.

(2)

The information processing device according to (1), in which
the direct sound component is estimated from the measurement signal collected in an anechoic room.

(3)

The information processing device according to (2), in which
the delay value is a delay value of a convolution signal generated by extracting the estimated direct sound component and convolving the direct sound component with the reference signal.

(4)

The information processing device according to any one of (1) to (3), in which
the reverberation processing is processing of dereverberation using, as the reference signal, a signal having characteristics containing no reverberation.

(5)

The information processing device according to any one of (1) to (4), in which
the reference signal is recorded as sound having sound quality higher than the observation signal.

22

(6)

The information processing device according to any one of (1) to (5), in which
the observation signal and the reference signal are signals of a vocal sound.

(7)

The information processing device according to any one of (1) to (6), in which
the observation signal and the reference signal are recorded by a microphone of a terminal device.

(8)

An information processing method including: performing training processing of generating training data by convolving a measurement signal representing acoustic characteristics collected by a same sound collection unit as a sound collection unit used for collecting an observation signal with a reference signal having sound quality and reverberation characteristics different from the observation signal, generating teaching data by adapting, to the reference signal, an average level and a delay value of a convolution signal generated by convolving a direct sound component of the measurement signal with the reference signal, and training a learning model for performing reverberation processing of the observation signal collected by the sound collection unit by using the training data and the teaching data as input data.

(9)

A program for causing a computer to execute training processing of: generating training data by convolving a measurement signal representing acoustic characteristics collected by a same sound collection unit as a sound collection unit used for collecting an observation signal with a reference signal having sound quality and reverberation characteristics different from the observation signal, generating teaching data by adapting, to the reference signal, an average level and a delay value of a convolution signal generated by convolving a direct sound component of the measurement signal with the reference signal, and training a learning model for performing reverberation processing of the observation signal collected by the sound collection unit by using the training data and the teaching data as input data.

(10)

An information processing device including:
a dereverberation unit that inputs second acoustic data collected by a microphone and outputs third acoustic data obtained by removing a reverberation component from the second acoustic data by using a learning model obtained by performing machine learning by using first data generated by convolving first acoustic data collected by the microphone with dry data containing no reverberation and second data generated by adapting, to the dry data, an average level and a delay value of a convolution signal generated by convolving a direct sound component of the first acoustic data with the dry data;
a reverberation component feature extraction unit that extracts feature data representing a reverberation component of the second acoustic data by using the second acoustic data and the third acoustic data; and
a reverberation addition unit that inputs sound source data, adds reverberation having characteristics based on the feature data, and outputs the sound source data.

(11)

The information processing device according to (10) further including:
a plurality of the dereverberation units and a plurality of the reverberation component feature extraction units; and a characteristic determination unit that selectively determines characteristics of the reverberation to be added to the sound source data by using the pieces of feature data extracted by the plurality of the reverberation component feature extraction units, respectively.

(12)

The information processing device according to (11) further including:

a user interface unit that generates control data corresponding to a user operation, in which the characteristic determination unit selects the characteristics of the reverberation to be added to the sound source data in accordance with the control data.

(13)

The information processing device according to (11) or (12), in which the characteristic determination unit determines characteristics of feature data selected from among the pieces of feature data extracted by the plurality of the reverberation component feature extraction units to be characteristics of the reverberation to be added to the sound source data.

(14)

The information processing device according to any one of (10) to (12) further including:

a plurality of the dereverberation units and a plurality of the reverberation component feature extraction units; and a characteristic determination unit that determines average characteristics of features represented by the pieces of feature data extracted by the plurality of the reverberation component feature extraction units to be characteristics of the reverberation to be added to the sound source data.

(15)

The information processing device according to any one of (10) to (14) further including:

a plurality of the reverberation addition units;

a mixer unit that synthesizes pieces of sound source data with reverberation output from the plurality of the reverberation addition units, respectively; and a total reverberation addition unit that adds reverberation having characteristics based on the feature data to the sound source data with reverberation synthesized by the mixer unit, and outputs the sound source data.

(16)

The information processing device according to any one of (10) to (15), in which the sound source data is data after correction processing.

(17)

The information processing device according to any one of (10) to (16) further including:

a user interface unit that generates control data corresponding to a user operation, in which the reverberation addition unit changes setting of adding the reverberation in accordance with the control data.

(18)

An information processing method including:

causing a computer to execute processing of inputting second acoustic data collected by a microphone and outputting third acoustic data obtained by removing a reverberation component from the second acoustic data by using a learning model obtained by performing machine learning by using first data generated by convolving first acoustic data collected by the microphone with dry data containing no reverberation and second data generated by adapting, to the dry data, an average level and a delay value of a convolution signal generated by convolving a direct sound component of the first acoustic data with the dry data, extracting feature data representing a reverberation component of the second acoustic data by using the second acoustic data and the third acoustic data, and inputting sound source data, adding reverberation having characteristics based on the feature data, and outputting the sound source data.

(19)

A program for causing a computer to execute processing of:

inputting second acoustic data collected by a microphone and outputting third acoustic data obtained by removing a reverberation component from the second acoustic data by using a learning model obtained by performing machine learning by using first data generated by convolving first acoustic data collected by the microphone with dry data containing no reverberation and second data generated by adapting, to the dry data, an average level and a delay value of a convolution signal generated by convolving a direct sound component of the first acoustic data with the dry data;

extracting feature data representing a reverberation component of the second acoustic data by using the second acoustic data and the third acoustic data; and inputting sound source data, adding reverberation having characteristics based on the feature data, and outputting the sound source data.

(20)

An information processing system including:

a microphone;

a learning model that is obtained by performing machine learning by using first data generated by convolving first acoustic data collected by the microphone with dry data containing no reverberation and second data generated by adapting, to the dry data, an average level and a delay value of a convolution signal generated by convolving a direct sound component of the first acoustic data with the dry data;

a sound source output unit that outputs sound source data;

a memory that stores second acoustic data collected by the microphone and the sound source data;

a dereverberation unit that inputs the second acoustic data and outputs third acoustic data obtained by removing a reverberation component from the second acoustic data by using the learning model;

a reverberation component feature extraction unit that extracts feature data representing a reverberation component of the second acoustic data by using the second acoustic data and the third acoustic data; and a reverberation addition unit that inputs the sound source data, adds reverberation having characteristics based on the feature data, and outputs the sound source data.

REFERENCE SIGNS LIST 1, 1A Information processing system
3, 3A information processing device
5 Microphone
6 Sound source output unit
8 Memory
9 Dereverberation unit
10 Reverberation component feature extraction unit
11 User interface unit
12, 12A Reverberation coefficient derivation unit
13 Reverberation addition unit

14 Mixer unit
15 Total reverberation addition unit
30 Training processing unit
31 Training data generation unit
20 Sound collection unit
32 Teaching data generation unit
33 DNN training unit
321 Direct sound extraction unit
322 Delay value measurement unit
323 Direct sound convolution unit
324 Average level ratio calculation unit
325 Characteristic addition unit

The invention claimed is:

1. An information processing device comprising:
circuitry including a central processing unit (CPU) configured to
generate training data by convolving a measurement signal representing acoustic characteristics collected by a same sound collection device as a sound collection device used for collecting an observation signal with a reference signal having sound quality and reverberation characteristics different from the observation signal,
generate teaching data with respect to the reference signal, from an average level and a delay value of a convolution signal generated by convolving a direct sound component of the measurement signal with the reference signal, and
train a learning model to perform reverberation processing of the observation signal collected by the sound collection device by using the training data and the teaching data as input data, wherein
the direct sound component is estimated from the measurement signal collected in an anechoic room, and
the delay value is a delay value of a convolution signal generated by extracting the estimated direct sound component and convolving the direct sound component with the reference signal.

2. The information processing device according to claim 1, wherein
the reverberation processing is processing of dereverberation using, as the reference signal, a signal having characteristics containing no reverberation.

3. The information processing device according to claim 1, wherein
the reference signal is recorded as sound having sound quality higher than the observation signal.

4. The information processing device according to claim 1, wherein
the observation signal and the reference signal are signals of a vocal sound.

5. The information processing device according to claim 1, wherein
the observation signal and the reference signal are recorded by a microphone of a terminal device.

6. A computer-implemented information processing method comprising:
performing training processing of generating training data by convolving a measurement signal representing acoustic characteristics collected by a same sound collection unit as a sound collection unit used for collecting an observation signal with a reference signal having sound quality and reverberation characteristics different from the observation signal;
generating teaching data with respect to the reference signal, from an average level and a delay value of a convolution signal generated by convolving a direct sound component of the measurement signal with the reference signal; and
training a learning model for performing reverberation processing of the observation signal collected by the sound collection unit by using the training data and the teaching data as input data, wherein
the direct sound component is estimated from the measurement signal collected in an anechoic room, and
the delay value is a delay value of a convolution signal generated by extracting the estimated direct sound component and convolving the direct sound component with the reference signal.

7. A non-transitory computer readable memory having computer code stored therein that when executed by a processor causes the processor to perform a method, the method comprising:
generating training data by convolving a measurement signal representing acoustic characteristics collected by a same sound collection unit as a sound collection unit used for collecting an observation signal with a reference signal having sound quality and reverberation characteristics different from the observation signal;
generating teaching data with respect to the reference signal, from an average level and a delay value of a convolution signal generated by convolving a direct sound component of the measurement signal with the reference signal; and
training a learning model for performing reverberation processing of the observation signal collected by the sound collection unit by using the training data and the teaching data as input data, wherein
the direct sound component is estimated from the measurement signal collected in an anechoic room, and
the delay value is a delay value of a convolution signal generated by extracting the estimated direct sound component and convolving the direct sound component with the reference signal.

8. An information processing device comprising:
circuitry including a central processing unit (CPU) configured to
input second acoustic data collected by a microphone and output third acoustic data obtained by removing a reverberation component from the second acoustic data by using a learning model obtained by performing machine learning by using first data generated by convolving first acoustic data collected by the microphone with dry data containing no reverberation and second data generated with respect to the dry data, from an average level and a delay value of a convolution signal generated by convolving a direct sound component of the first acoustic data with the dry data wherein the direct sound component is estimated from the first acoustic data collected in an anechoic room, and wherein the delay value is a delay value of a convolution signal generated by extracting the estimated direct sound component and convolving the direct sound component with the dry data,
extract feature data representing a reverberation component of the second acoustic data by using the second acoustic data and the third acoustic data, and
input sound source data, add reverberation having characteristics based on the feature data, and output the sound source data.

9. The information processing device according to claim 8, wherein the circuitry is further configured to implement:

a plurality of the dereverberation units and a plurality of the reverberation component feature extraction units; and a characteristic determination unit that selectively determines characteristics of the reverberation to be added to the sound source data by using the pieces of feature data extracted by the plurality of the reverberation component feature extraction units, respectively.

10. The information processing device according to claim 9, further comprising:

a user interface that generates control data corresponding to a user operation, wherein the characteristic determination unit selects the characteristics of the reverberation to be added to the sound source data in accordance with the control data.

11. The information processing device according to claim 9, wherein the characteristic determination unit determines characteristics of feature data selected from among the pieces of feature data extracted by the plurality of the reverberation component feature extraction units to be characteristics of the reverberation to be added to the sound source data.

12. The information processing device according to claim 8, wherein the circuitry is further configured to implement:

a plurality of the dereverberation units and a plurality of the reverberation component feature extraction units; and a characteristic determination unit that determines average characteristics of features represented by the pieces of feature data extracted by the plurality of the reverberation component feature extraction units to be characteristics of the reverberation to be added to the sound source data.

13. The information processing device according to claim 8, wherein the circuitry is configured to implement a plurality of reverberation addition units;

a mixer that synthesizes pieces of sound source data with reverberation output from the plurality of the reverberation addition units, respectively; and a total reverberation addition unit that adds reverberation having characteristics based on the feature data to the sound source data with reverberation synthesized by the mixer, and outputs the sound source data.

14. The information processing device according to claim 8, wherein the sound source data is data after correction processing.

15. The information processing device according to claim 8, further comprising:

a user interface that generates control data corresponding to a user operation, wherein the circuitry is configured to change an amount of reverberation in accordance with the control data.

16. An information processing method comprising:

causing a computer to execute processing of inputting second acoustic data collected by a microphone and outputting third acoustic data obtained by removing a reverberation component from the second acoustic data by using a learning model obtained by performing machine learning by using first data generated by convolving first acoustic data collected by the microphone with dry data containing no reverberation and second data generated with respect to the dry data, from an average level and a delay value of a convolution signal generated by convolving a direct sound component of the first acoustic data with the dry data, wherein the direct sound component is estimated from the first acoustic data collected in an anechoic room, and wherein the delay value is a delay value of a convolution signal generated by extracting the estimated direct sound component and convolving the direct sound component with the dry data, extracting feature data representing a reverberation component of the second acoustic data by using the second acoustic data and the third acoustic data, and inputting sound source data, adding reverberation having characteristics based on the feature data, and outputting the sound source data.

17. A non-transitory computer readable memory having computer code stored therein that when executed by a processor causes the processor to perform a method, the method comprising:

inputting second acoustic data collected by a microphone and outputting third acoustic data obtained by removing a reverberation component from the second acoustic data by using a learning model obtained by performing machine learning by using first data generated by convolving first acoustic data collected by the microphone with dry data containing no reverberation and second data generated with respect to the dry data, from an average level and a delay value of a convolution signal generated by convolving a direct sound component of the first acoustic data with the dry data, wherein the direct sound component is estimated from the first acoustic data collected in an anechoic room, and wherein the delay value is a delay value of a convolution signal generated by extracting the estimated direct sound component and convolving the direct sound component with the dry data;

extracting feature data representing a reverberation component of the second acoustic data by using the second acoustic data and the third acoustic data; and inputting sound source data, adding reverberation having characteristics based on the feature data, and outputting the sound source data.

18. An information processing system comprising:

a microphone;

a learning model that is obtained by performing machine learning on a computer by using first data generated by convolving first acoustic data collected by the microphone with dry data containing no reverberation and second data generated with respect to the dry data, from an average level and a delay value of a convolution signal generated by convolving a direct sound component of the first acoustic data with the dry data, wherein the direct sound component is estimated from the first acoustic data collected in an anechoic room, and wherein the delay value is a delay value of a convolution signal generated by extracting the estimated direct sound component and convolving the direct sound component with the dry data;

a sound source that outputs sound source data;

a memory that stores second acoustic data collected by the microphone and the sound source data; and circuitry including a central processing unit (CPU) coupled to the microphone and configured to input the second acoustic data from the microphone and output third acoustic data obtained by removing a reverberation component from the second acoustic data by using the learning model, extract feature data representing a reverberation component of the second acoustic data by using the second acoustic data and the third acoustic data, and input the sound source data, add reverberation having
characteristics based on the feature data, and output the
sound source data.

\*   \*   \*   \*   \*